United States Patent [19]
Williams et al.

[11] Patent Number: 5,999,918
[45] Date of Patent: Dec. 7, 1999

[54] INTERACTIVE COLOR CONFIDENCE INDICATORS FOR STATISTICAL DATA

[75] Inventors: James Benjamin Williams, Sherborn; Stanley W. Lyness, Sharon; Francois G. Gadenne, Marblehead; William J. Fox, Wayland, all of Mass.

[73] Assignee: Rational Investors, Inc., Cambridge, Mass.

[21] Appl. No.: 08/828,911

[22] Filed: Apr. 2, 1997

[51] Int. Cl.⁶ ...................................................... H04N 7/12
[52] U.S. Cl. ............................ 705/36; 702/179; 702/180; 702/181; 705/35
[58] Field of Search ........................ 705/35, 36; 358/530; 702/179, 180, 181; 345/326

[56] References Cited

U.S. PATENT DOCUMENTS

| | | | |
|---|---|---|---|
| 4,868,766 | 9/1989 | Oosterholt | 345/420 |
| 4,896,291 | 1/1990 | Gest et al. | 345/353 |
| 4,930,010 | 5/1990 | MacDonald | 358/530 |
| 4,943,938 | 7/1990 | Aoshima et al. | 345/422 |
| 5,132,899 | 7/1992 | Fox | 705/36 |
| 5,148,365 | 9/1992 | Dembo | 364/402 |
| 5,167,010 | 11/1992 | Elm et al. | 706/45 |
| 5,185,696 | 2/1993 | Yoshino et al. | 705/36 |
| 5,220,500 | 6/1993 | Baird et al. | 705/36 |
| 5,222,019 | 6/1993 | Yoshino et al. | 705/36 |
| 5,228,119 | 7/1993 | Milhalisin et al. | 345/418 |

(List continued on next page.)

OTHER PUBLICATIONS

William F. Sharpe Stanford University, Mean, Variance and Distributions, Excerpt from onine textbook published on Internet Sep. 11, 1995 Internet.

Press Release by Simon Public Relations Group for AExpert, Inc., Program Based on Nobel Prize–Winning Modern Portfolio Theory Provides Investors with Expert Research at Their Fingertips, "Expert Optimizer Helps Investors Make the Most of Their Mutual Fund Decisions" May 15, 1996 Philadelphia, PA.

Press Release by Simon Public Relations Group for AExpert, Inc., Company Delivers Vast Collections of Information to Investors and Financial Advisors Via Their Computer Screens, AExpert Inc. Brings the Tools of the Financial World Right to User's Fingertips May 15, 1996 Philadelphia, PA.

Biography on Kenneth S. Ray, Chairman and CEO of AExpert, Inc.

Randy Neumann, "The Modern Portfolio Theory and Law", Tuesday, Mar. 26, 1996 Access Financial Planning.

Robert B. Gillam, Spring 1996 Money Manage Review Guest Interview.

James M. Little, "A Changing Marketplace"Spring 1996 Metals in the News.

Union Bank of Switzerland, Mar. 1996 International Equity Markets from the Perspective of a Swiss Franc Investor.

The Vanguard Retirement Planner, Vanguard Marketing Corporation, Distributor, pp. 1–20, 1995.

Peter Coffee, Karen Moser, Superb Interactive Functions, Market Engineering Corp. Crystal Ball 1.0.3, 1989.

Robin Nelson, Forecast Pro for Windows Ver 1.00A:business forecasting for the non–statistician, Business Forecast Systems Inc.'s Forecasting statistical Software package, 1992.

*Primary Examiner*—Frantzy Poinvil
*Assistant Examiner*—Raquel Alvarez
*Attorney, Agent, or Firm*—Maureen Stretch

[57] ABSTRACT

A computer interface system that includes interactive interface controls as well as aural and kinetic interface controls to assist in educating a user, in profiling a user, and in controlling and monitoring the implementation of actions involving probabilistic distributions. The system allows the user to indicate, either directly or indirectly, a confidence level that he or she desires for actions such as investments, as well as other characteristics and constraints. The user is able to manipulate the interface controls to evaluate results in terms of confidence and risk. If the user approves the results and his or her profile, in a preferred embodiment the selections are transmitted to effectuate an action.

14 Claims, 36 Drawing Sheets

U.S. PATENT DOCUMENTS

| | | | |
|---|---|---|---|
| 5,245,535 | 9/1993 | Weiss et al. | 705/36 |
| 5,251,131 | 10/1993 | Massand et al. | 364/419.08 |
| 5,333,247 | 7/1994 | Gest et al. | 345/438 |
| 5,374,924 | 12/1994 | McKiel, Jr. | 340/825.19 |
| 5,452,406 | 9/1995 | Butler et al. | 345/426 |
| 5,452,413 | 9/1995 | Blades | 345/349 |
| 5,454,104 | 9/1995 | Steidlmayer et al. | 707/4 |
| 5,473,745 | 12/1995 | Berry et al. | 345/340 |
| 5,499,319 | 3/1996 | Sultan et al. | 706/1 |
| 5,511,157 | 4/1996 | Wang | 345/437 |
| 5,521,814 | 5/1996 | Teran et al. | 364/528.01 |
| 5,542,039 | 7/1996 | Brinson et al. | 345/326 |
| 5,673,402 | 9/1997 | Ryan et al. | 395/238 |
| 5,752,236 | 5/1998 | Sexton et al. | 705/4 |

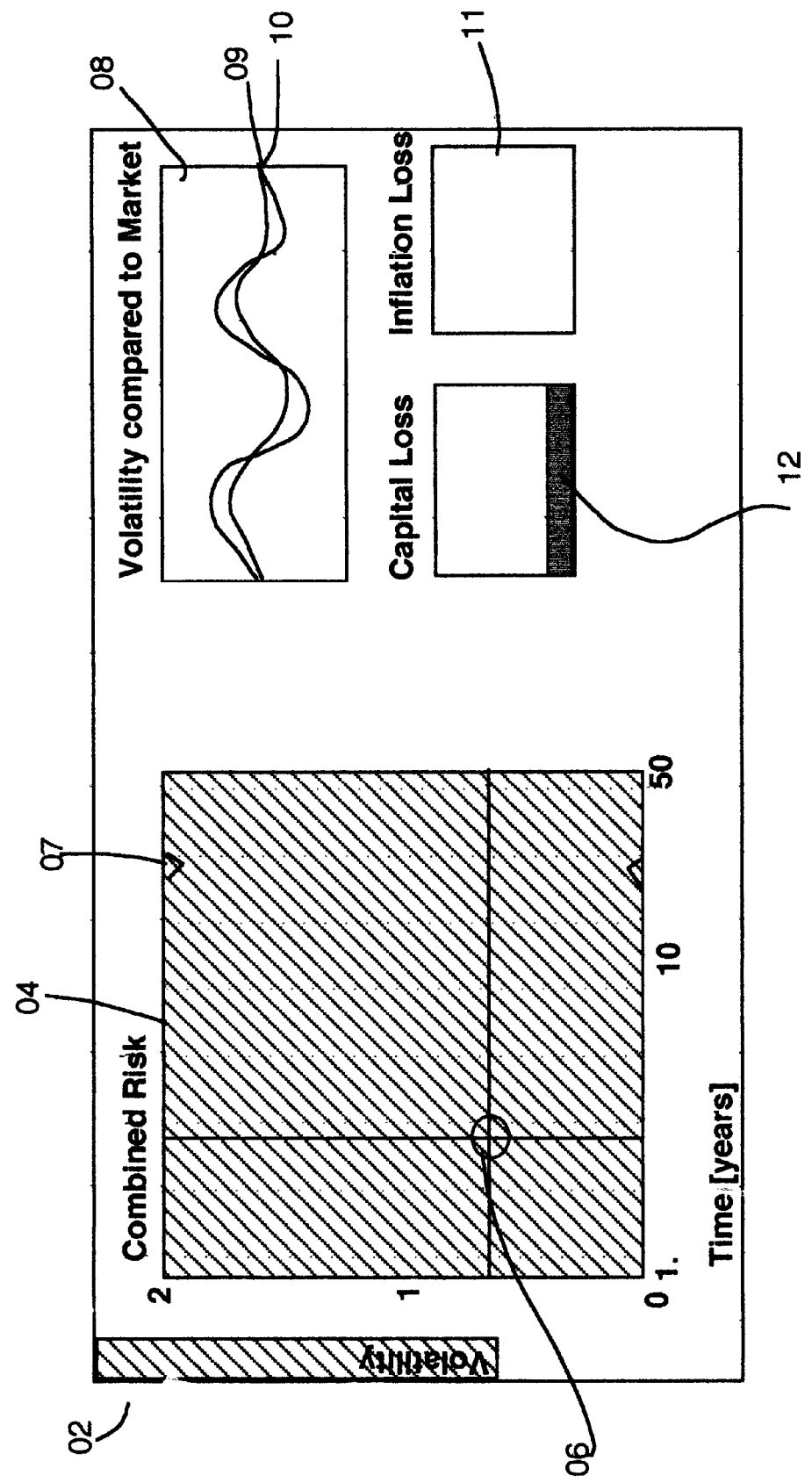

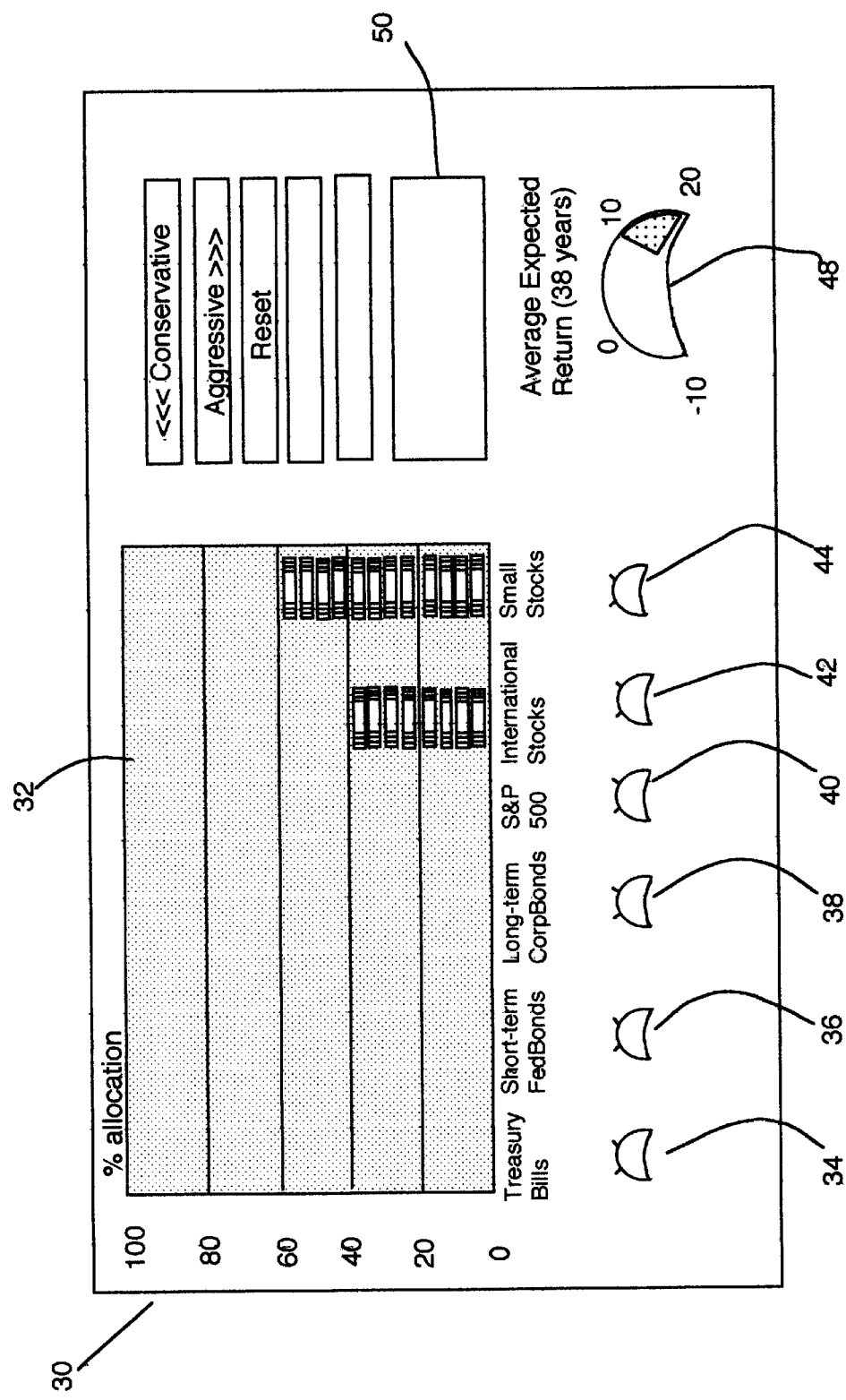

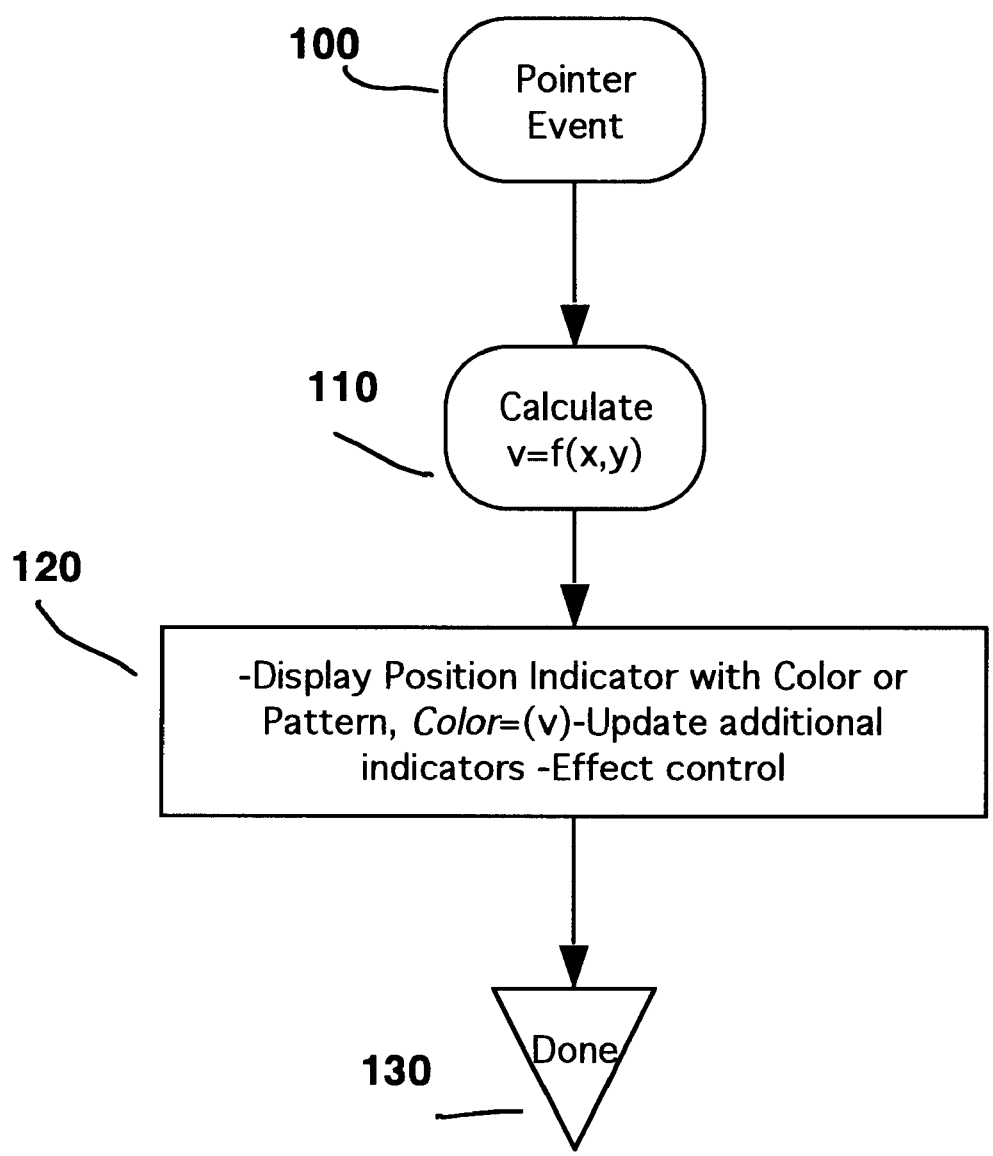

Fig. 6a

Step 1. Basic Information About You

Express Retirement Planner

Please fill in the boxes, or verify that what we already have here is correct.

Year you were born................ 1951

You are Male: ●
or Female: ○

This is your expected salary (plus bonuses and commissions) from the Company this year. $100,000

Standard retirement age for you is 66 years. At what age do you plan to retire?
We will use your life expectancy of 85 years as a basic for planning.

*Note: you will be able to experiment more with these numbers as you move through the Planner.*

Back    Next

1. Background
2. Needs
3. Sources
4. Gap
5. Goal
6. Plan
7. Investment
8. Review
9. Enrollment
Q & A
Map
Quit

Fig. 6c

Step 6. Plan your Contribution

Express Retirement Planner

1. Background
2. Needs
3. Sources
4. Gap
5. Goal
6. Plan
7. Investment
8. Review
9. Enrollment Q & A
Map
Quit 9.50% ($9,500)

6.30% ($6,300)

3.20% ($3,200)

0% ($0)

Save in 401(k) Plan percent of salary (dollars per year)

Meeting your Retirement Income Goal $0    $60,000    $80,000    $100,000

Color shows the probable income your savings and other sources can provide during your retirement.

1. Move the slider at left to indicate your cintributionto your 401(k) account, or enter the amount here $8,233 or 8.23 percent of salary.

2. As you change the amount of your contribution, note in the indicator above that the amount of retirement income you may expect also changes. This is based on estimated average investment returns of 5.5%.

3. You would nee returns of 7.7% to be reasonably confident that you would meet your goal with this level of contribution.

Back    Next

Fig. 6d

[Your Company Name Here]

[Back] [Help] [Map] [Quit]

How confident do you want to be about the Risk and Return statistics used in our estimations?

When estimating returns from portfolios, we also take into account the risk or the variation in possible returns. As you can see on the Market History page, the stock market can give you good *average* returns over many years, but almost never gives an average return. It can be substantially better or substantially worse than average over any given time period. How safe do you want to be in *guessing* the future from past performance?

You can control the level of confidence that we use when estimating "bad case" performance of investments. By bad case performance, we don't mean the worst case performance, but rather what you can expect to exceed, or do better than, x% of the time. At 50%, it is a fifty/fifty chance that the investments will do better than our estimate. At 90%, there is a 90% chance that the investments will provide better returns. Conservative investors will be more comfortable with higher levels; we use 85% as a default, but you can set it higher or lower.

What confidence do you want to have that the estimated investment performance will  90% provide returns sufficient to fund your retirement?

Using historical investment performance, we will make estimates so that your future returns should fall below our estimates only one time out of:  10

Important Note: these estimates of investment performance are not predictions. We are simply taking historical performance, and assuming that future performance will tend to be like past performance. This lets you get a feeling for the relative investments of the different types of investments available to you. Remember though, *past performance is not a guarantee of future results*. Even setting the confidence factor to 99% is not a guarantee that your investments will do better than the estimates.

Fig. 6e

Be sure you have retirement income for ALL of the years you are retired.

We often hear the term 'life expectancy', but is that the right number for retirement planning? Probably not. Life expectancy is the *median* number of years that a population of people can expect to live from a given age. Median means that half of that population will live longer and half will live fewer years. But this means if you spend in retirement exactly that amount that wxhausts your savings at the median lifetime, you have half a chance -- aflip of the coin -- that you could run out of savings and have little or no income for many years.

How safe would you like to be in your planning? You can adjust the number below, labelled Confidence, from 50% to 99%. At 50%, we calculate your typical median life expectancy -- which means you have a fifty/fifty chance of living beyond your planned savings if you live longer than the age estimated below. Selecting 99% means that you can have 99% confidence that your savings based on the estimate below will see you through.

Are you:     ○ Female      ○ Male

What confidence do you want to have that
your savings will provide for all the years of
your retirement?                                      80%

Based on actuarial statistics, this means there
will be one chance in                                 5
that you will live beyond age                         85

The planning calculators will try to make sure you have
income to *at least* this age.                        Next

Fig. 9
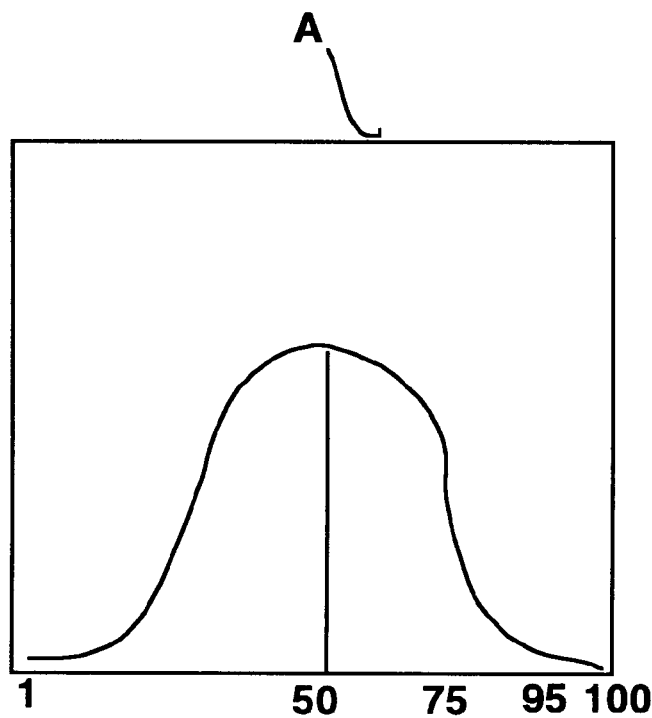
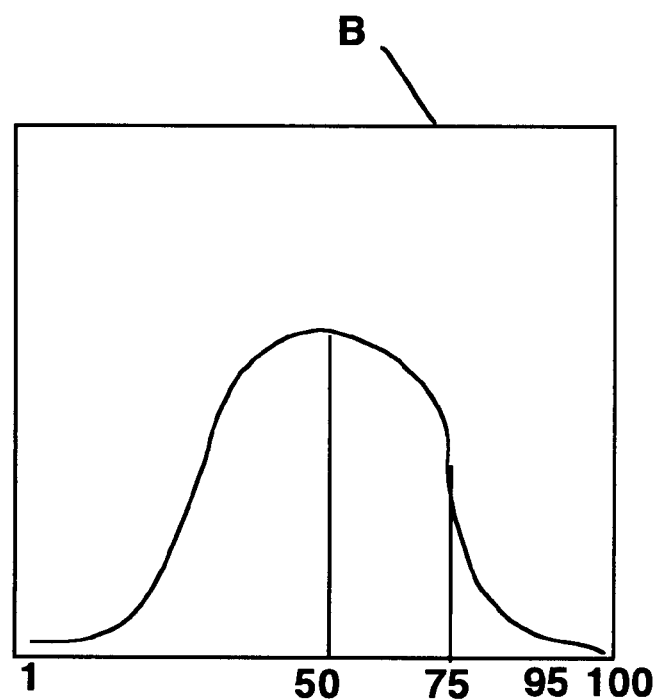

Fig. 10

Profile Client 1

Client-supplied profile data

Client-validated evaluation functions

VIA's for Client: VIA3, VIA9

Holdings and results

INTERACTIVE COLOR CONFIDENCE INDICATORS FOR STATISTICAL DATA

BACKGROUND OF THE INVENTION

1. Field of the Invention

This invention relates generally to the field of computer user interfaces, and more particularly to computer applications such as financial investments involving probablistic distributions and the interactive displays thereof.

2. Background

Individuals without special training who are outside the financial community but wish to investigate and make fairly sophisticated financial choices in stocks, bonds, mutual funds, or other investment vehicles have traditionally had to consult one or more "craftsmen"—specialist advisors or brokers versed in markets, statistics and probability to obtain customized advice on planning and making investments. More and more of these individual investors are being forced to develop investment strategies of their own as a result of changes in the workplace. Large corporate employers are increasingly trying to move the responsibility for benefits programs such as retirement benefits into the hands of employees, through such vehicles as 401(k) plans. The downsizing of many corporations has also led to a burgeoning of self-employed individuals who need to take full responsibility for investments and planning.

Financial planners at banks and brokerage houses employ specialists who offer these kinds of services to individuals. However, a typical advisor can usually only provide services to a limited number individuals a day, since this is labor-intensive. To employ people to provide such services, an institution usually has to charge fees or commissions that yield on the order of $1,000 USD a customer a year as of this writing. The institution's revenues and profits for such a service are thus limited by the labor-intensive nature of an advisory service.

Financial institutions have developed or purchased automation tools to help the advisors do their research but this has not greatly reduced the expense of employing personnel. If it costs $150,000 USD per person per year in fully-burdened costs to have advisors on staff, then the institution needs to have at least that amount of revenue per advisor in annual fees and commissions.

This means that the individuals seeking customized investment advice pay a fairly high premium for it.

For the financial institutions, this means that revenues for such services are essentially linear, in that they depend directly on the number of advisors employed. In economic terms, such a service is a variable-cost business, not a fixed-cost one.

Another problem with personalized investment advice is called "dispersion." That is, if two individuals of the same age, in the same occupations and family situations, having similar goals, priorities, and risk-taking profiles see two different investment advisors at the same financial institution it is quite possible they will get very different investment advice, simply because of the human differences in their advisors and the differences in the way people learn and absorb information. If one gets advice that is very successful for her and the other individual gets advice that yields poor results, this can sometimes be a problem for the institution.

The explosion of publicly available information on the Internet theoretically opens up more options for an individual investor. However, many people do not have the time or the inclination to find or absorb all the information available. Most of it is published in text form, linked by hypertext to other sites with articles of similar interest. While great strides have been made in the area of technical analysis of investments, using techniques such as neural networks, genetic algorithms, and fuzzy logic, much of this is complex and best approached by those having a background in mathematics and statistics as well as a thorough grounding in risk assessment techniques.

The relatively few individuals outside the financial community who actively pursue such information pro-actively can find special-purpose software programs to help them analyze the opportunities, such as MetaStock and Windows on Wall Street or Aexpert. The programs available for such use usually assume a significant amount of investment, market, and jargon sophistication in the user and most of them are sold to specialists, such as financial planners and portfolio managers, not individual "lay" persons. Some of the programs for specialists and pro-active end users are also optimized for a given type of result. For example, there are automated advice "black boxes" of computerized investment systems optimized for one purpose, usually for being very aggressive, such as taking positions in futures contracts that are heavily leveraged. That kind of optimization also makes them less practical for use by ordinary individuals. Others, such as Aexpert, optimize using known theories, such as the Nobel-prize winning concepts that are now collectively called Modern Portfolio Theory, which optimizes investments in the securities in a portfolio so that the risks associated with the different types of securities in the portfolio do not move in lockstep with each other but exhibit what is known as low covariance-in which the risk for one investment is likely to decrease as the risk for another with low covariance tends to go up.

Specialist software programs also exist for lower risk specialized areas, such as doing arbitrage, an example of which is buying currency in volume on one currency exchange and selling it for a slight profit on another. Arbitrage, like some other specialized forms of investment and speculation such as hedging, may not be a practical investment tool for many individual investors. These types of programs are usually used primarily by financial institutions.

For the majority of individual investors outside the financial community, who might be called "reluctant" investors, the amount of publicly available information is usually overwhelming. To many of the reluctant investors, esoteric choices, such as arbitrage or opportunities to get into "spot gold" are not useful. Similarly, while many people today are familiar with the concept of investing in a mutual fund as a simpler way to invest, there are now over 7,000 mutual funds to choose from.

While there are a few consumer financial investment programs for individual consumer use on home computers, such as Intuit's Quicken™ for IBM PC's and Wealthbuilder™ Apple Macintosh™ computers, these tend to be limited in scope. They are usually designed to help solve one or two problems, such as planning for retirement or planning for a child's college education, and the solutions they offer are usually based on formulaic approaches published in books and the financial press that do not take an individual's investment style, risk tolerance and other preferences into account in a significant way.

Not only are computer applications of broad scope for the ordinary individual investor lacking, so are education and adaptation. Most individuals employed outside of financial institutions have had very little education on mathematical analysis, probability and statistics, or financial matters. Public and private school curricula usually do not offer courses on the financial markets and investment vehicles as part of a general education. This is one reason why many individual investors seek out the services of a specialist advisor—to learn about the various markets and kinds of investments that are possible. A common error made by many individual investors who do not seek advice or take the time to learn is adopting a too conservative investment strategy out of ignorance.

For example, many books and publications directed to the "lay" investor say that if he or she is young, and has a good income, he or she can invest in riskier portfolios, while if the person is older and closer to retirement, he or she should invest in very low-risk or no risk vehicles such as money market funds. The younger person may prefer to have a higher probability of success than that offered by a riskier portfolio, while the older person may in fact need and want to invest in a portfolio that lowers risk but still provides a high probability of a good return over a shorter time period. A smaller percentage of individual investors make errors out of ignorance in another direction—by buying when the security price is high and selling, out of panic usually, when the price goes down. It is the fear of such losses that prompt the majority of individual investors to assume too conservative an approach to investment strategies for retirement funding, etc. As a result, ignorance in this area can be very costly, while education may well pay not only for itself but for a retirement or a child's college fund.

Studies have shown that different individuals tend to learn in different ways. Many people learn primarily through visual aids such as text or graphics, while others learn best through aural techniques such as hearing the spoken word, and still others through kinetic (or kinesthetic) or physical methods involving physical movement. In the same way, individuals may have different levels of risk aversion or risk-taking inclinations in their makeup. Thus, two individuals of the same income level, age, gender, profession, and life circumstances may still differ significantly in the way they absorb information and the way they feel about taking risks. One may prefer to learn through visual aids, and have a moderate aversion to risk-taking while the other person may prefer to hear someone explain a subject and have a high tolerance for risk-taking. Yet another may need to have some kind of "hands-on" physical involvement with he process to absorb information. Similarly, people vary in the degree to which they want to be involved in and in control of such activities as financial investments. Many simply prefer to keep it simple and delegate as much control as possible, but others may want to scrutinize every transaction.

In addition, the formulaic approaches used by many financial planners and in consumer financial planning investment programs usually ignore the fact that their projections arise from the use of probabilistic distributions (which can create a potentially unacceptable margin of error in the outcomes.)

First, those experts and programs which estimate retirement funds and investment strategies based on life expectancies usually do not explain to the user that life expectancy is a median. A median, as the term is used in statistics, is the middle value of a frequency distribution such as a Gaussian distribution such that the probabilities of the variable taking a value below and above it are equal. In other words, making plans based on a median is the same as taking a 50/50 chance that the individual's retirement fund will run out of money. Occasionally, a planner may use a 75th percentile for life expectancy instead of a median, providing a somewhat higher probability of adequate retirement funding—but still allowing for a 1 in 4 chance that the funding will run out.

Second, the plans and programs that project future earnings of a portfolio of selections based on average returns in the past, also introduce another 50/50 chance that projected average returns will not be there in the future.

Even fairly sophisticated investors and some advisors may be unaware of the consequences of plans calculated using medians and averages or fixed percentiles. Thus, the conservative, reluctant investor, who wishes to invest in such a way that he or she has a 75% to 95% probability of adequate returns over time, can unwittingly take on much more risk by basing strategies on the advice of planners and programs using median or fixed percentile life expectancies and average returns. The problem, in other words, does not arise solely from the use of plans based on medians or averages, but from the likelihood that the consequences of such use are not understood by the user.

SUMMARY OF THE INVENTION

A computer interface system that includes interactive interface controls as well as aural and kinetic interface controls to assist in educating a user, in profiling a user, and in controlling and monitoring the implementation of actions based on probabilistic distributions. The system allows the user to indicate, either directly or indirectly, a confidence level that he or she desires for actions involving probabilistic distributions such as investments. In a preferred embodiment, a profiler also allows the user to specify other characteristics and constraints related to manipulation of one or more probabilistic distributions. The user is able to manipulate the interface controls to evaluate results in terms of confidence and risk. If the user approves the results and his or her profile, in a preferred embodiment the selections are transmitted to effectuate an action.

It is an aspect of the present invention is that it provides a number of confidence indicators applicable to probabilistic distributions.

It is another aspect of the present invention that it helps to educate a user about the consequences of actions related to probabilistic distributions.

BRIEF DESCRIPTION OF THE DRAWINGS

FIG. 1c is a color schematic drawing of a two-dimensional slider control and confidence indicator according to the method and apparatus of the present invention.

FIG. 1g is a color schematic drawing of an interactive asset allocator according to the method and apparatus of the present invention.

FIG. 3 is a flow diagram of the controls for the two-dimensional slider according to the method and apparatus of the present invention.

FIG. 6a is an illustrative profiling screen shown in color according to the method and apparatus of the present invention.

FIG. 6c is a third illustrative profiling screen shown in color according to the method and apparatus of the present invention.

FIG. 6d is another illustrative profiling screen shown in color according to the method and apparatus of the present invention.

FIG. 6e is also an illustrative profiling screen shown in color according to the method and apparatus of the present invention.

FIG. 9 shows graphs of probabilistic distributions.

FIG. 10 is a schematic diagram of a client profile database entry according to the method and apparatus of the present invention.

DETAILED DESCRIPTION OF THE INVENTION

Figure 1A:
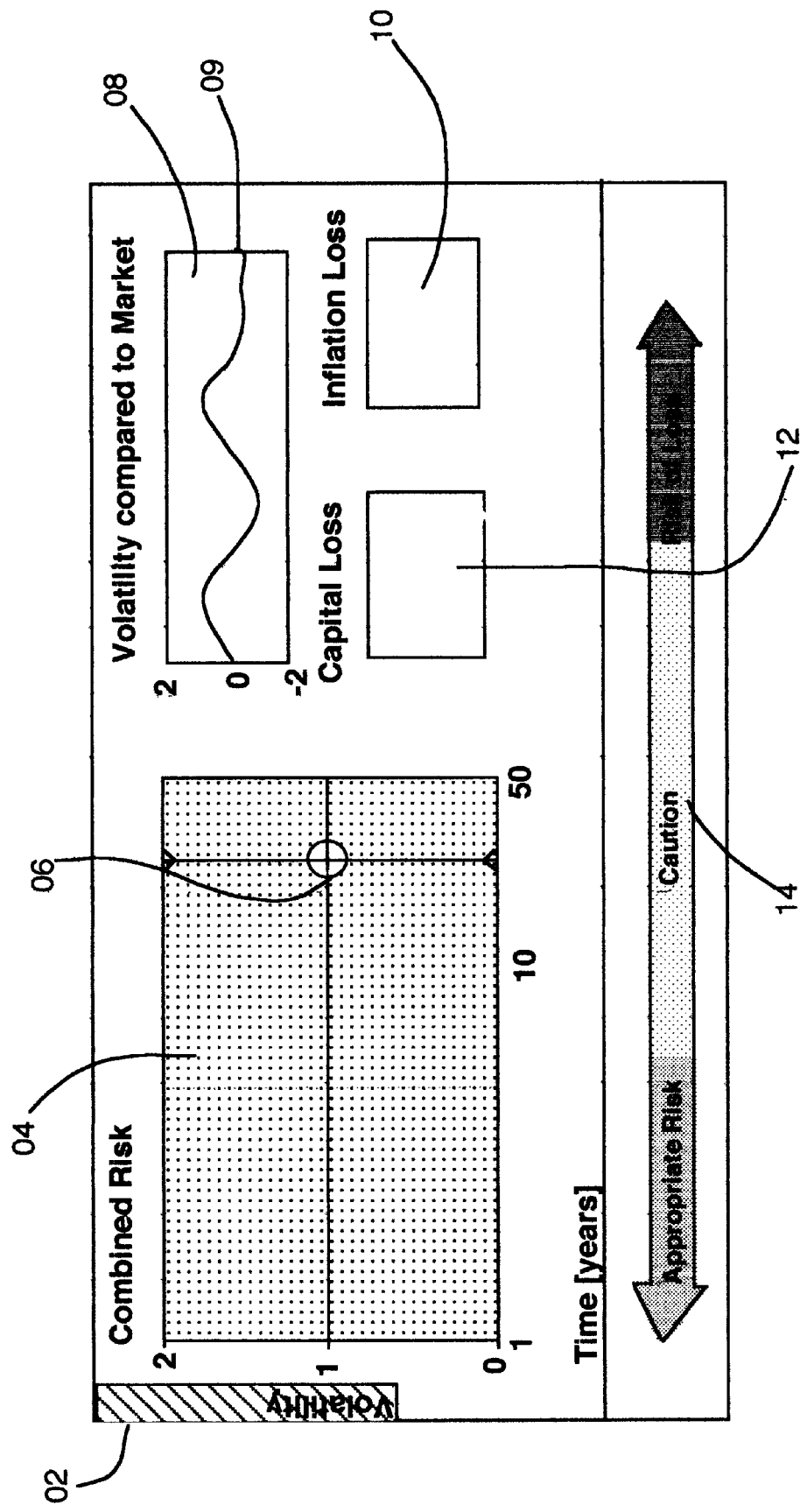
FIG. 1a is a schematic depiction of a two dimensional color slider control and confidence indicator according to the method and apparatus of the present invention.

In FIG. 1a the confidence indicator interactive color display 02 of the virtual investment advisor of a preferred embodiment is shown. As can be seen, the confidence indicator interactive color display 02 includes a combined risk window 04, a volatility window 08, a capital loss window 12 and an inflation loss window 10. Underneath confidence indicator interactive color display 02 is a color bar 14 showing the continuum of colors associated with risk of loss (orange to red) at one extreme and with appropriate risk (green), at the other, with a yellow caution zone in between. In the combined risk window 04, information is presented along two axes—the x axis representing time in years that an investment or portfolio of investments is held, and the y axis representing the projected volatility of the investment. In a preferred embodiment, a user of the system manipulates a pointing device to move target 06 around in combined risk window 04. As will be apparent to those skilled in the art, the pointing device could be a mouse, a joystick, trackball, keyboard, touch pad, or any of a number of similar devices for communicating the results of a physical gesture by a user to a computer.

In FIG. 1a, target 06 points to an area of combined risk window 04 representing a long holding period for a portfolio of volatility that is roughly identical to that of the market as a whole. This can be seen in volatility window 08, where the red line is superimposed over a black line representing market volatility, rendering the black line invisible. As is also shown in FIG. 1a, the risk of inflation loss window 10 shows very little risk, as does risk of capital loss window 12. Thus, in a preferred embodiment of the present invention, combined risk window 04 is colored light green, to visually convey that an appropriate investment risk level has been selected.

Figure 1B:
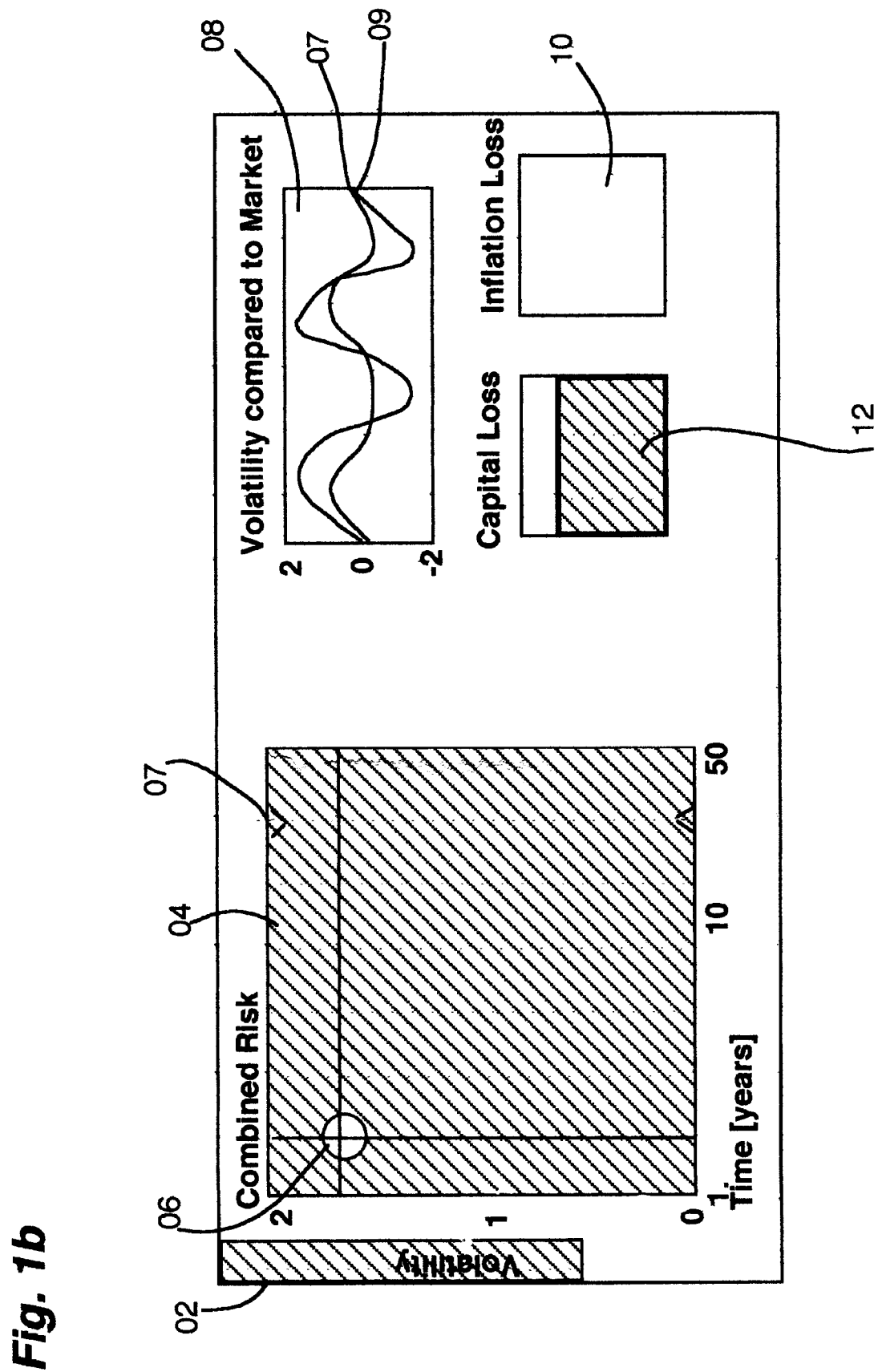
FIG. 1b is a schematic drawing of a two-dimensional color slider control and confidence indicator according to the method and apparatus of the present invention.

Turning now to FIG. 1b, the opposite situation is displayed with visual and graphic emphasis. In FIG. 1b, target 06 is positioned at an x-y location of combined risk window 04 showing a short holding period and a portfolio that is more volatile than the market. In volatility window 08, red line 09 is seen to be more volatile than the black line 07 the market volatility line. And while inflation loss window 10 shows that the risk of loss potentially caused by inflation for this portfolio would be low, capital loss window 12 shows that there is a very high risk of loss for capital with this strategy.

In a preferred embodiment, the contents of volatility window 08, inflation loss window 10 and capital loss window 12 are generated simultaneously with the movement of target 06 in combined risk window 04, so that apparently instant feedback is available in color to the user indicating the significance of a change in strategy.

Now referring to FIG. 1c, a much improved status is shown. Here, target 06 has been moved in combined risk window 04 to an x,y location corresponding to a holding period close to five years in length and for a portfolio with an estimated volatility that is less than market volatility. A preferred embodiment of the present invention calculates the confidence level to associate with this proposed investment (as will be described in more detail below) and generates a dark green color for combined risk window 04, indicating a very acceptable risk level, which is also reflected in the risk of capital loss window 12, and inflation loss window 10. Notice also in volatility window 08, that the volatility of this portfolio 09, is less than the volatility of the market 07.

Still in FIG. 1c, it can be seen that triangles 07 extend inwardly into combined risk window 04. In a preferred embodiment, triangles 07 represent a recommended time horizon that has already been calculated. As will be apparent to those skilled in the art, similar triangles 07 could be used on the y or volatility axis of combined risk window 04 to show a recommended volatility level, if desired.

In a preferred embodiment, confidence indicator interactive color display 02 allows users who learn best by visual aids to see, instantaneously and graphically, what the results of a given investment strategy might be. Thus, by moving target 06 back and forth and up and down and noting the color change the visual learner sees instantly the relationship between volatility and holding period as the color changes from green for acceptable risk, to red for inappropriate risk and back with the movement of the target 06. As will be apparent to those skilled in the art, other color schemes could be used to indicate the nature of the risk or activity, and for color-blind individuals, varying patterns of black and white could be used, such as narrow stripes for acceptable risk and wide stripes for unacceptable.

Similarly, while a preferred embodiment of the present invention uses the confidence indicator interactive color display 02 for providing immediate feedback on investment options, it will be apparent to those skilled in the art that it could also be used in other industries and applications where a user can choose from two variables or parameters to show a result of any reasonably continuous function or effect control of one. The parameters might be as simple as a topographical map with x and y coordinates, in which the x coordinate represents distance and the y coordinate the varying height of the land mass over a distance. Then a confidence indicator for flying over the land at a height above sea level sufficient to avoid crashing into hills might be constructed according to the present invention using V=f(x,y), where the function f is reasonably continuous. By reasonably continuous is meant a situation or function which is not supersensitive to the smallest of changes, but one which responds to changes in a somewhat measured manner, hence "continuous."

And, while a preferred embodiment of the present invention uses confidence indicator interactive color display 02 to dynamically show the confidence level a user may have for a suggested portfolio over time, it can also be used, as stated, to show the result of any reasonably continuous function in a way that shields the user from unnecessary visual complexity or iterative displays.

Back in FIG. 1a, as the color and visual changes help the user who relies on visual information to learn new ideas, similarly, target 06 and the use of a pointing device helps the kinetic learner. By physically moving target 06 over the area of combined risk window 04 of FIG. 1a, the individual who learns kinetically is able to take a literal "hands-on" approach to learn about the interrelationship of volatility and holding period.

Aural learners who have indicated a preference for hearing the results would (as is described in more detail below) be able to hear the text spoken, or, in an alternative embodiment, would be able to hear sounds ranging from pleasant to unpleasant sounds as the target 06 moves from acceptable to unacceptable ranges. This interrelated use of multiple presentation styles in a dynamically interactive system to provide immediate feedback to the user about mathematically complex choices enables the present invention to educate unobtrusively while also allowing the user to apply the information learned immediately and effectuate controls based on it.

Figure 1D:
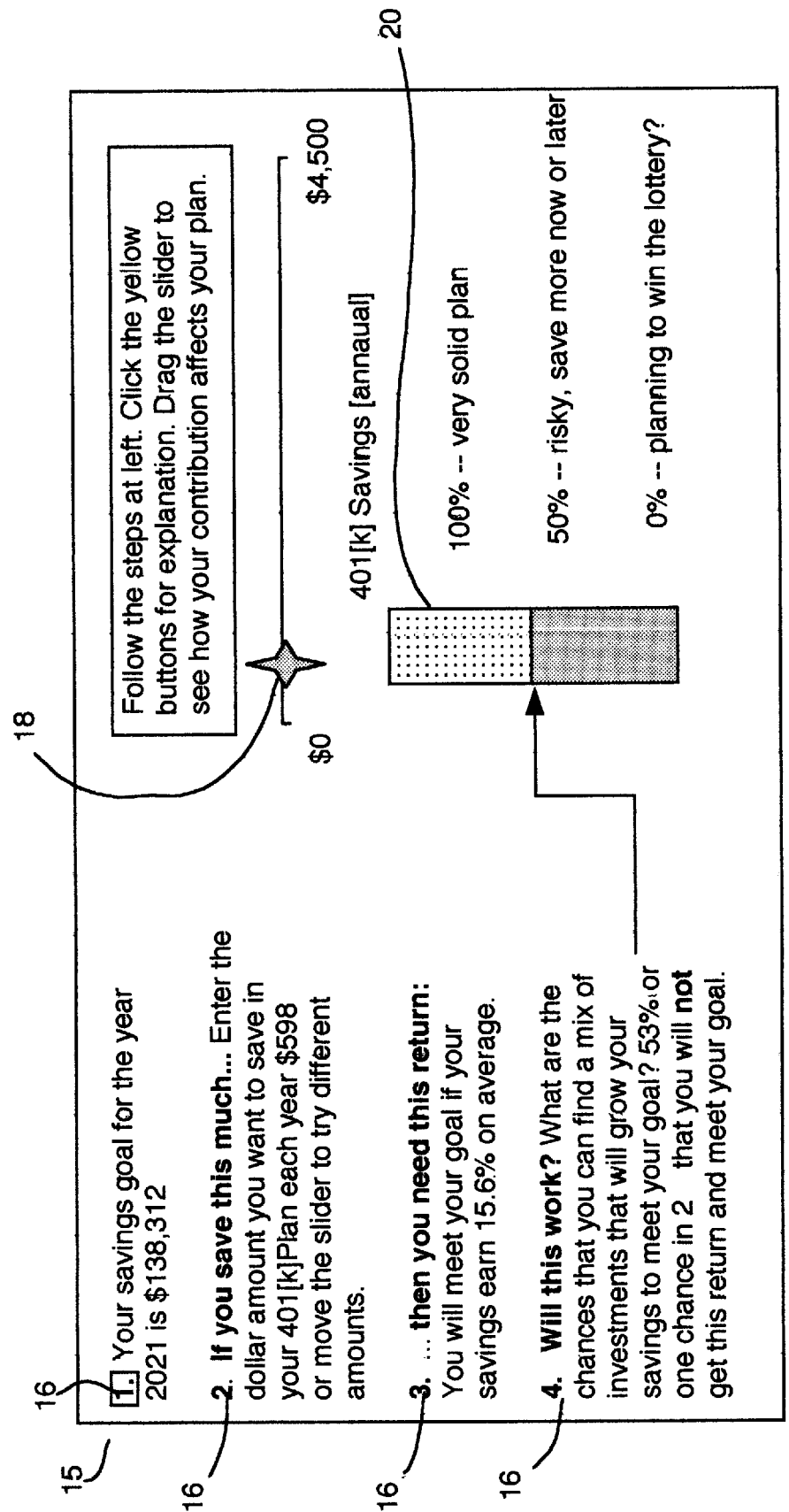
FIG. 1d is a color schematic drawing of a graphics window and confidence indicator according to the method and apparatus of the present invention.
Figure 1E:
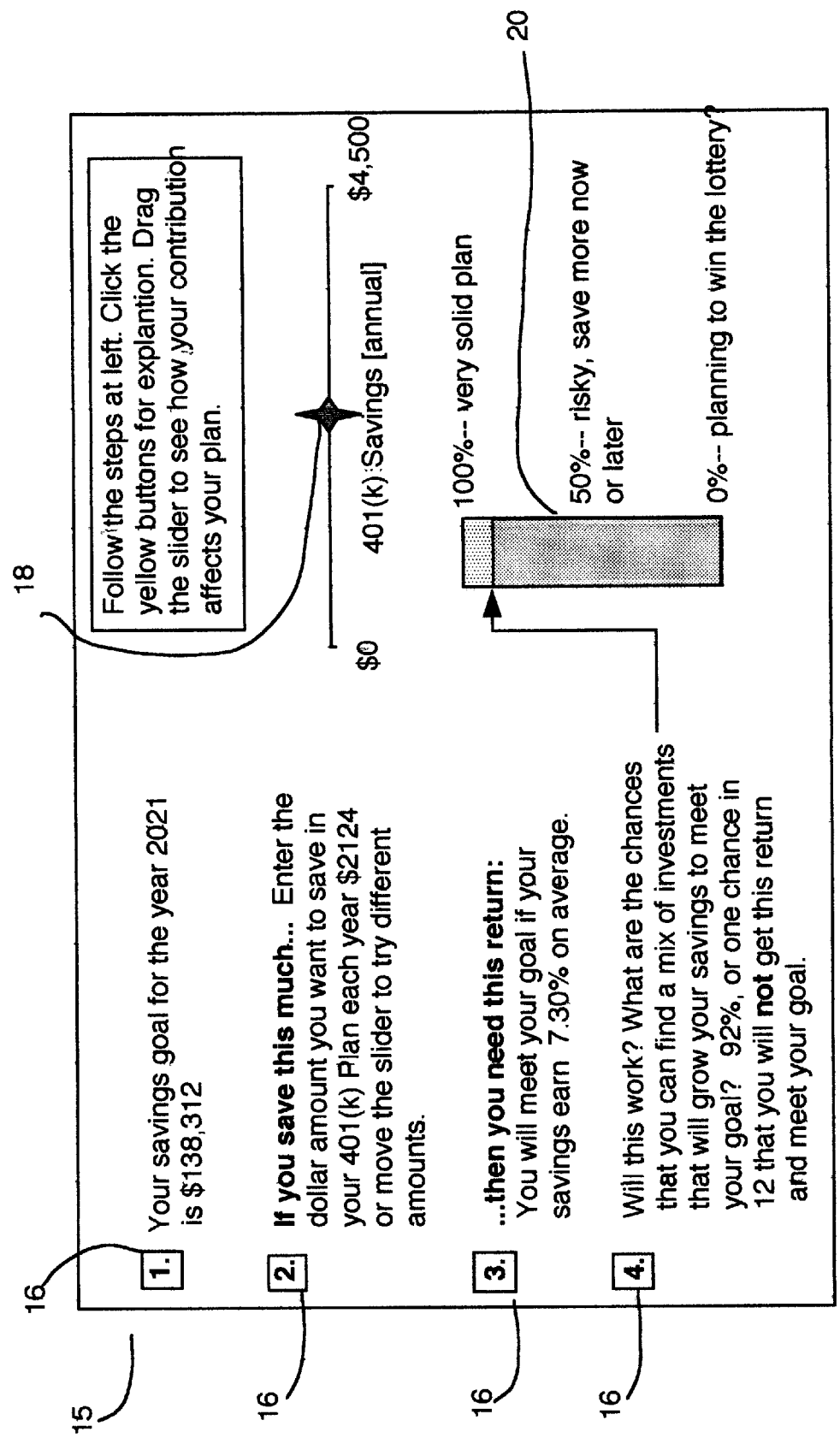
FIG. 1e is a color schematic drawing of a graphics window and confidence indicator according to the method and apparatus of the present invention.
Figure 1F:
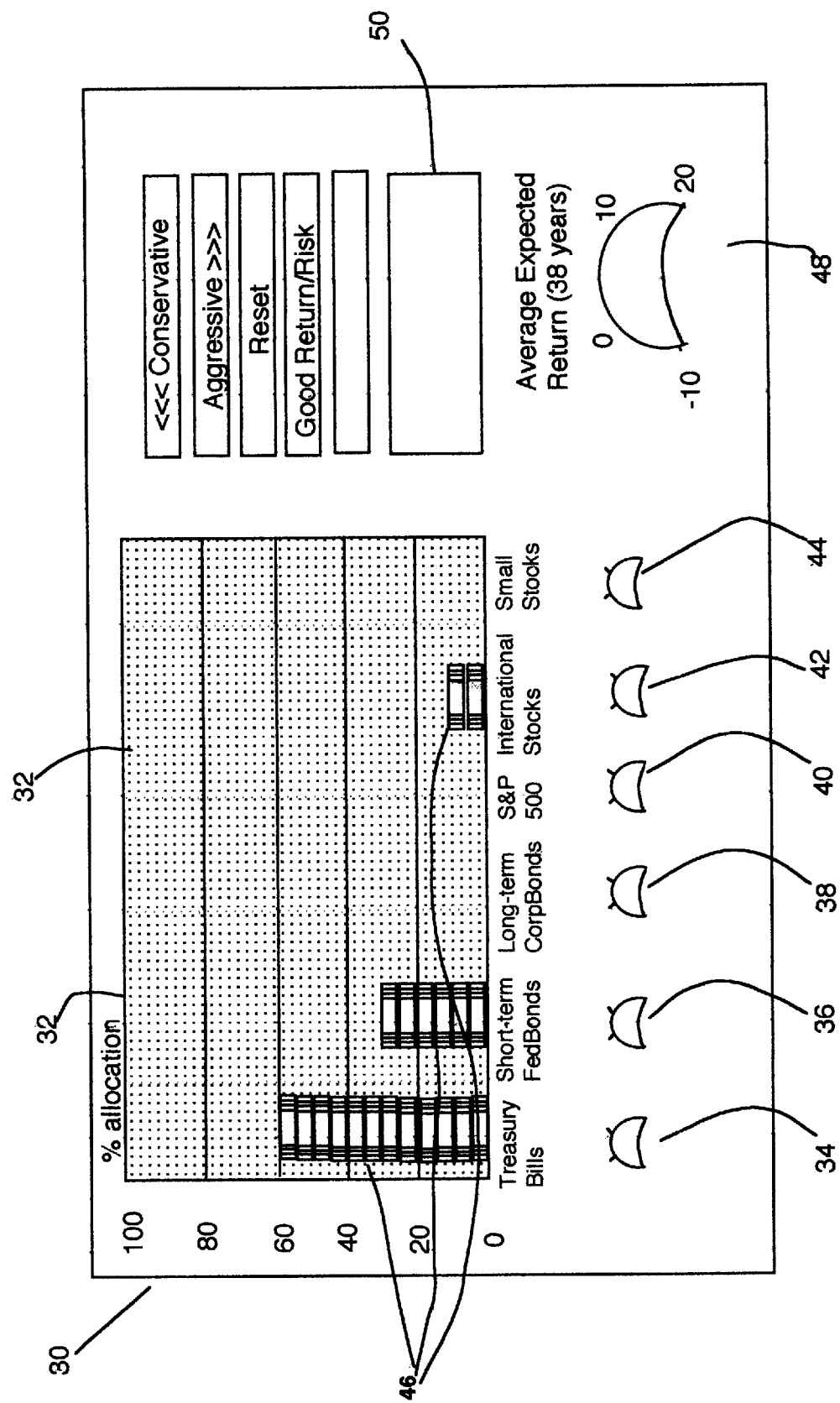
FIG. 1f is a color schematic drawing of an interactive asset allocator according to the method and apparatus of the present invention.
Figure 1H:
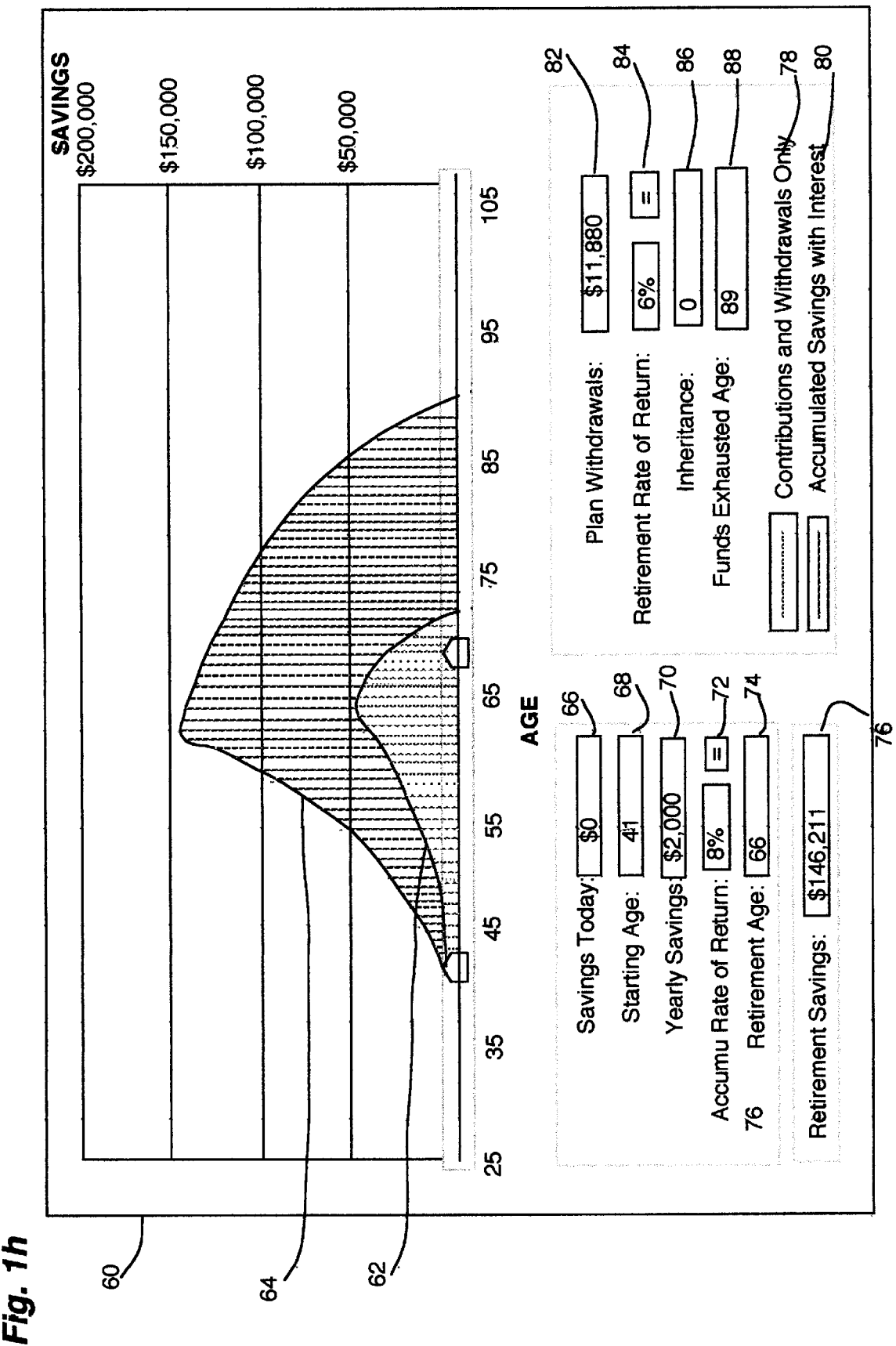
FIG. 1h is a color schematic drawing of a comprehensive interactive planner according to the method and apparatus of the present invention.
Figure 1I:
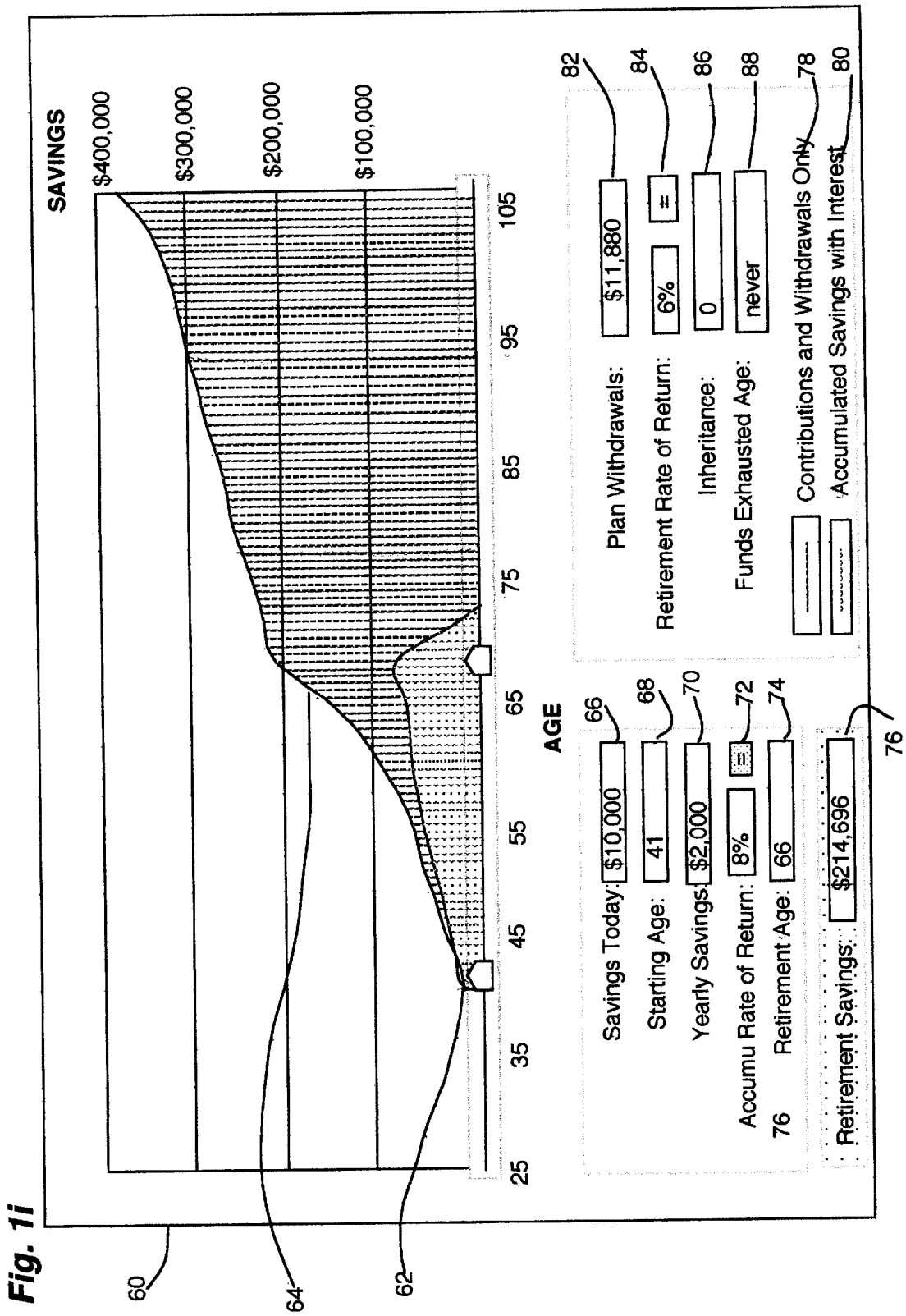
FIG. 1i is a color schematic of a comprehensive planner according to the method and apparatus of the present invention.
Figure 1J:
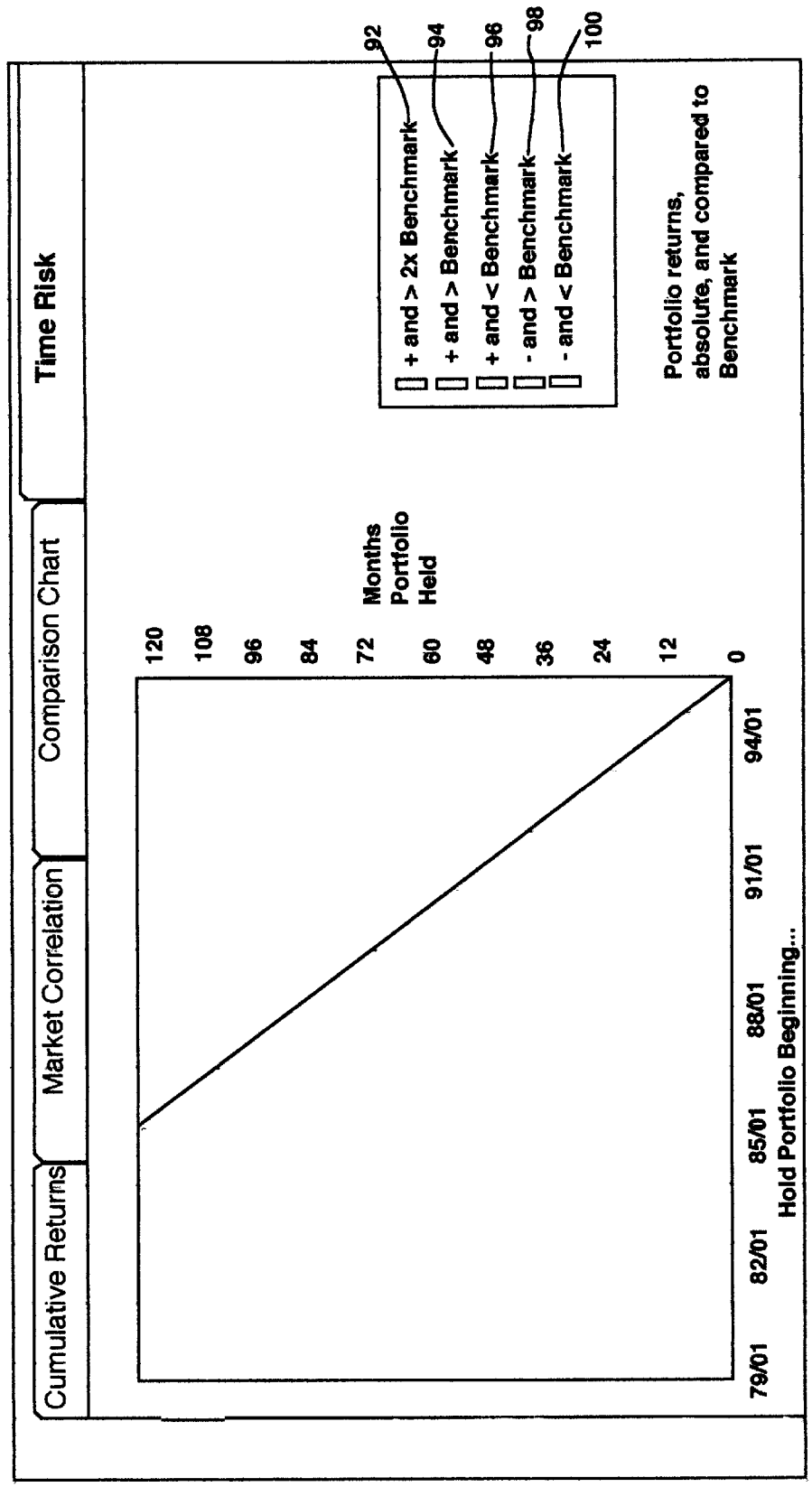
FIG. 1j is a color schematic of a time risk indicator according to the method and apparatus of the present invention.
Figure 1K:
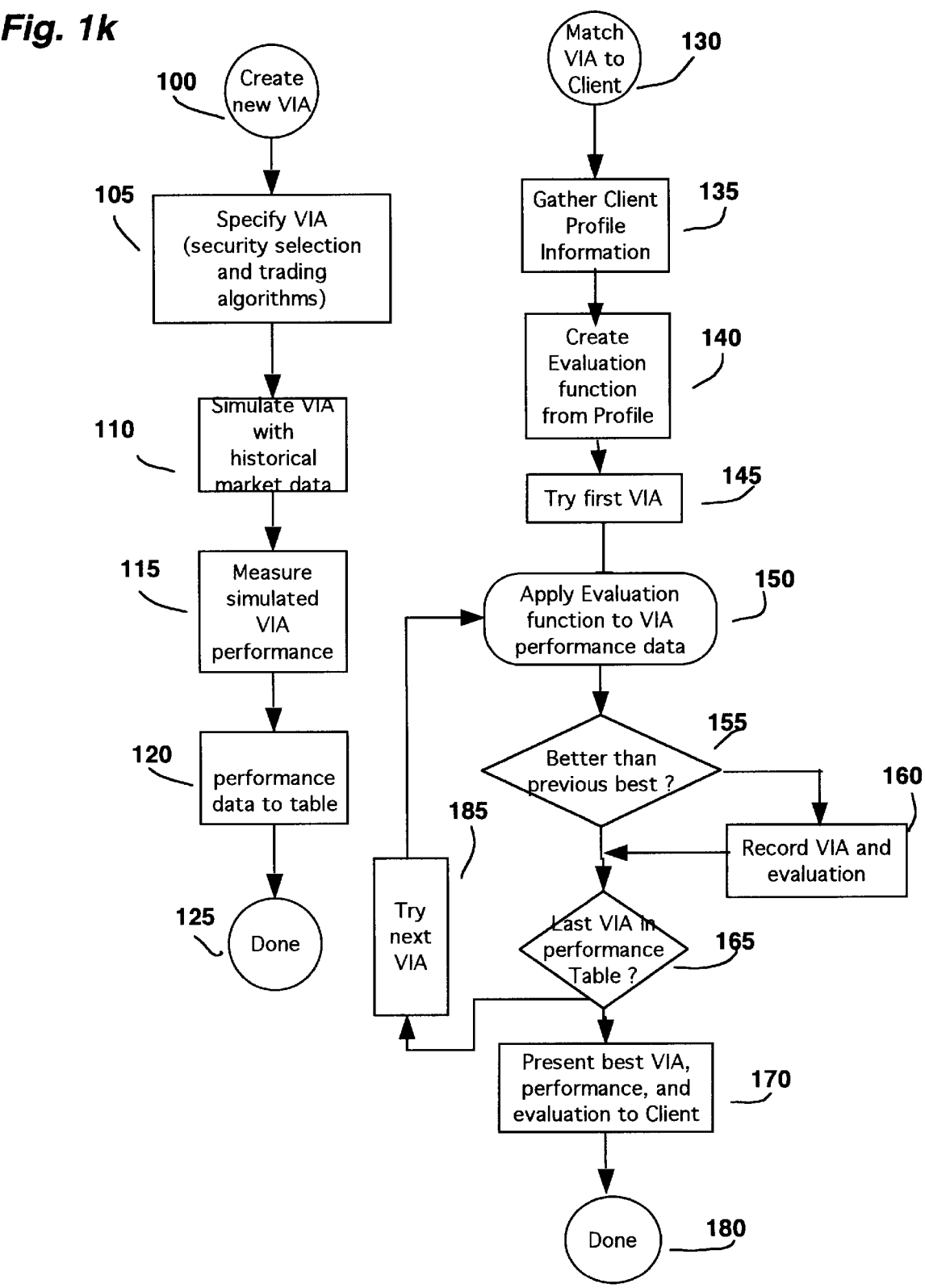
FIG. 1k is a flow diagram of a virtual investment advisor according to the method and apparatus of the present invention.
Figure 1L:
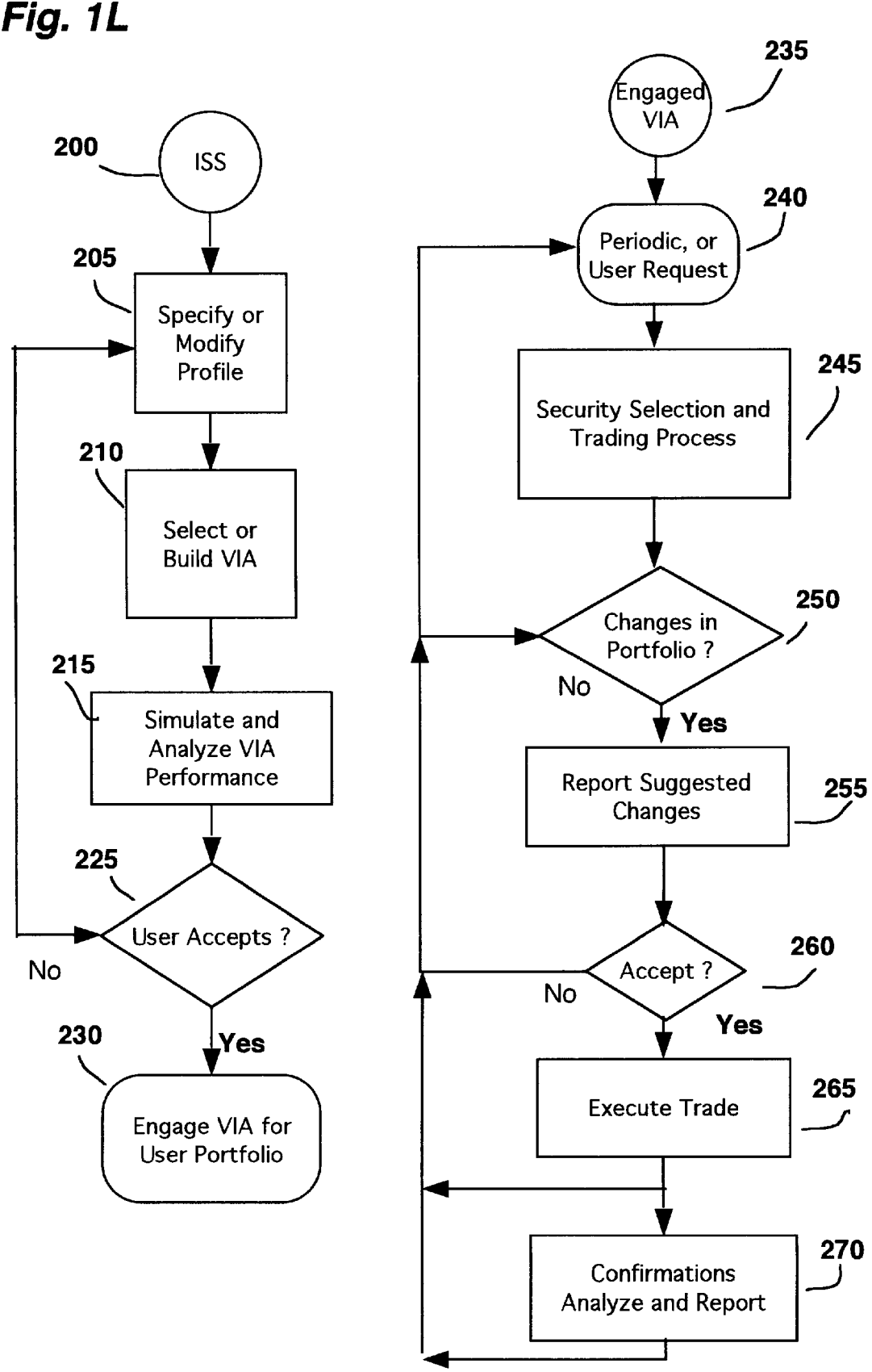
FIG. 1L is a flow diagram of an investment support system according to the method and apparatus of the present invention

Turning now to FIGS. 1k and 1L, flow diagrams show the overall flow of the virtual investment advisor, the investment support system, and the confidence indicator interactive color display 02 of a preferred embodiment of the present invention. As can be seen at step 100 in FIG. 1k, the system initializes a virtual investment advisor for the user by specifying, at step 105, the activities it is to perform and the techniques to use.

In a preferred embodiment, the present invention selects from a number of existing techniques as well as new developments for analyzing securities for investment purposes. For example, linear regression analysis, modern portfolio theory applications and variations, genetic algorithms, neural networks and any of a number of analytical "black boxes" can be used to screen and select a portfolio. These are used either by executing the programmed algorithms directly or by calling remote computer servers to execute the functions and return the results over a network.

Still in FIG. 1k, a preferred embodiment of the present invention simulates the results that might occur from the recommendations made by a virtual investment advisor using historical performance data, and measure the performance of the portfolio recommended by the virtual investment advisor. This measurement can be used as input to the calculations for the confidence indicator interactive color display 02, or as inputs to the investment allocator described below. At step 120, of FIG. 1k, the present invention stores the results of the measurements in a virtual investment advisor performance database as will be described below. In a preferred embodiment, typical performance data includes measures of portfolio return, risk, risk-adjusted returns, attributional measures such as types of securities selected, nature of returns (capital gains versus dividends), and operation measures such as frequency of trading and sensitivity of results to precise execution of brokerage orders, among other items.

As FIG. 1k illustrates, the creation of a new virtual investment advisor can occur independently of the other actions of the present invention. In one preferred embodiment, once one or more virtual investment advisors exist, they can be matched, beginning at step 130 of FIG. 1k to a particular client, thus a client may have several virtual investment advisors. In an alternative preferred embodiment, a complete subsystem using just one virtual investment advisor might be used, such as a retirement planning system for recommending allocations of mutual funds or similar investments.

And again, in FIG. 1k, client profile information is gathered at step 135. As will be described in more detail below, this allows the present invention to store information about the client's age, income, financial goals, net worth, tax status, risk preferences and so forth. Once a client profile has been created, a preferred embodiment of the present invention creates an evaluation function for that profile. As will be apparent to those skilled in the art, an evaluation function could be as simple as finding maximum investment return, maximum risk-adjusted return, minimum loss, and so on. Alternatively, an evaluation function could be arbitrarily complex, taking into account such additional factors as after-tax returns, transaction cost models, client aversion to volatility or risk of loss over time, and so on.

Still in FIG. 1k, it can be seen that the evaluation function is applied to the stored results from a first virtual investment advisor at step 150, and then compared to previous results at step 155. If the previous results are better than the last, this is recorded at step 160 and the system checks, at step 165 to see if there are other virtual investment advisors to evaluate for this client. If yes, these are checked at step 185. If not, a preferred embodiment of the present invention presents the best virtual investment advisor VIA, performance and evaluation to the client. This can be done in conjunction with the confidence indicator interactive color display 02, the investment allocator, and with the other interactive learning features of the present invention, described in more detail below. In a preferred embodiment, the investment allocator described below is used to display the suggested allocation and allow the user to either override the suggested one, or accept it.

Turning now to FIG. 1L, the operation of an investment support system according to the method and apparatus of the present invention is shown. As can be seen, at step 205 the investment support system allows the user to specify or modify his or her profile. If the new profile requires the selection of a new virtual investment advisor, this is done at steps 210 and 215, with the results of the simulation and analysis function interactively displayed with the confidence indicator interactive color display 02 and or the investment allocator at step 220. If the user accepts this new virtual investment advisor, this is noted at step 230 and the virtual investment advisor is engaged for that user's portfolio and that fact is stored in the client profile database.

In a preferred embodiment, a virtual investment advisor is implemented as a software agent, which, when given instruction by the user continues to execute from time to time, independent of user action in order to represent the investment interests of the user. Changes in the markets or securities in the portfolio may trigger the virtual investment advisor VIA to notify the user through the investment support system that attention is required.

This latter process is seen in FIG. 1L, showing that a virtual investment advisor VIA was engaged, at step 235 and at step 240 is now either making a periodic request on its own, or at the prompting of the user. In a preferred embodiment, the virtual investment advisor performs its security selection and trading processes at step 245. The investment support system may be informed at step 250 that the virtual investment advisor is recommending changes in the client's portfolio. In a preferred embodiment, the investment support system can obtain the client's approval for the changes in one of two ways. First, the investment support system can display the recommended changes and ask the user whether or not he or she accepts them, or, if a virtual investment advisor software agent has been authorized by the client to approve trades independently, the investment support system can verify this fact. As shown at step 260, the investment support system will determine in one of these two ways whether or not the proposed changes should be implemented. If they have been approved, the investment support system at step 265 will cause the trade to be executed, at step 265 by means described in more detail below.

Still in FIG. 1L, once the trade has been executed and confirmed to the investment support system, at step 270, the results of the trade are analyzed and reported to the user. In a preferred embodiment, periodic and on-demand reporting is also available. Generally, the investment support system, in addition to hosting virtual investment advisors can answer questions or provide advice a user might need, for example such as the mathematical relationship of any two or more of the following areas. These can be made available to the user for interactive/kinetic analysis as it pertains to his or her specific circumstances:

rate of savings;

style/objective of investment;

investment risk or comfort;

retirement income expectations.

Note also, that in a preferred embodiment, confidence is used as both an input the user can specify as a desired level, as well as a computed output.

Figure 1M:
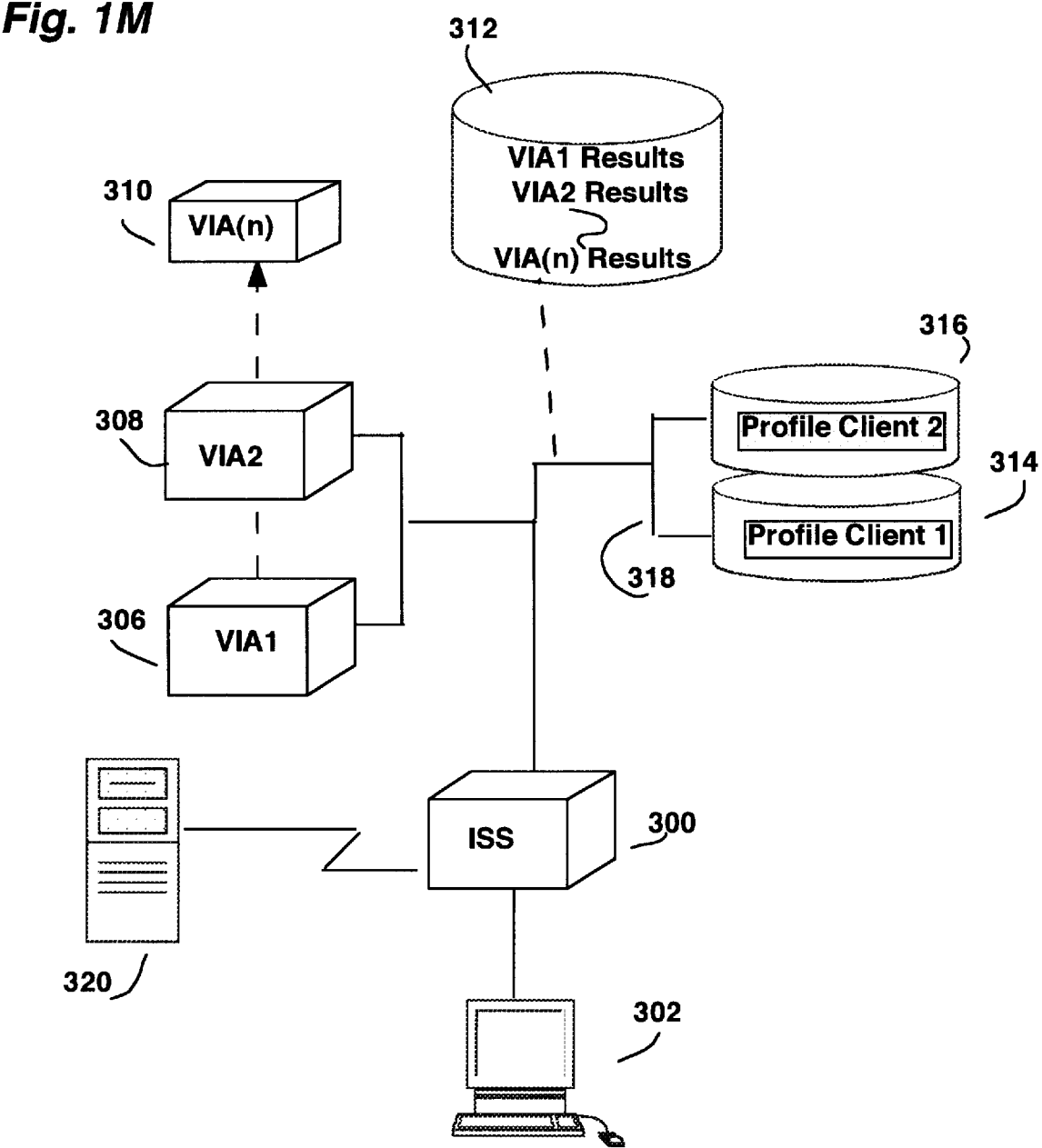
FIG. 1M is a schematic drawing of a configuration of the present invention.

Now referring to FIG. 1M, a schematic block diagram of the investment support system ISS of the present invention is shown. As can be seen, investment support system ISS 300, in a preferred embodiment, is a computer program stored in a computer that is also connected to a display terminal 302, a client profile database 318, a series of virtual investment advisors 306, 308, 310, and a virtual investment advisor database 312. Similarly, the computer in which investment support system ISS 300 is executing is also in communication with another computer 320, over telecommunications network 322 in a preferred embodiment. As will be apparent to those skilled in the art, investment support system ISS 300 could also communicate with display terminal 302 over the Internet, as well. This configuration is shown in FIG. 1N, where investment support system ISS 300 is connected over telecommunications network 322 to display terminal 302, as well as to remote computer 320.

Figure 1N:
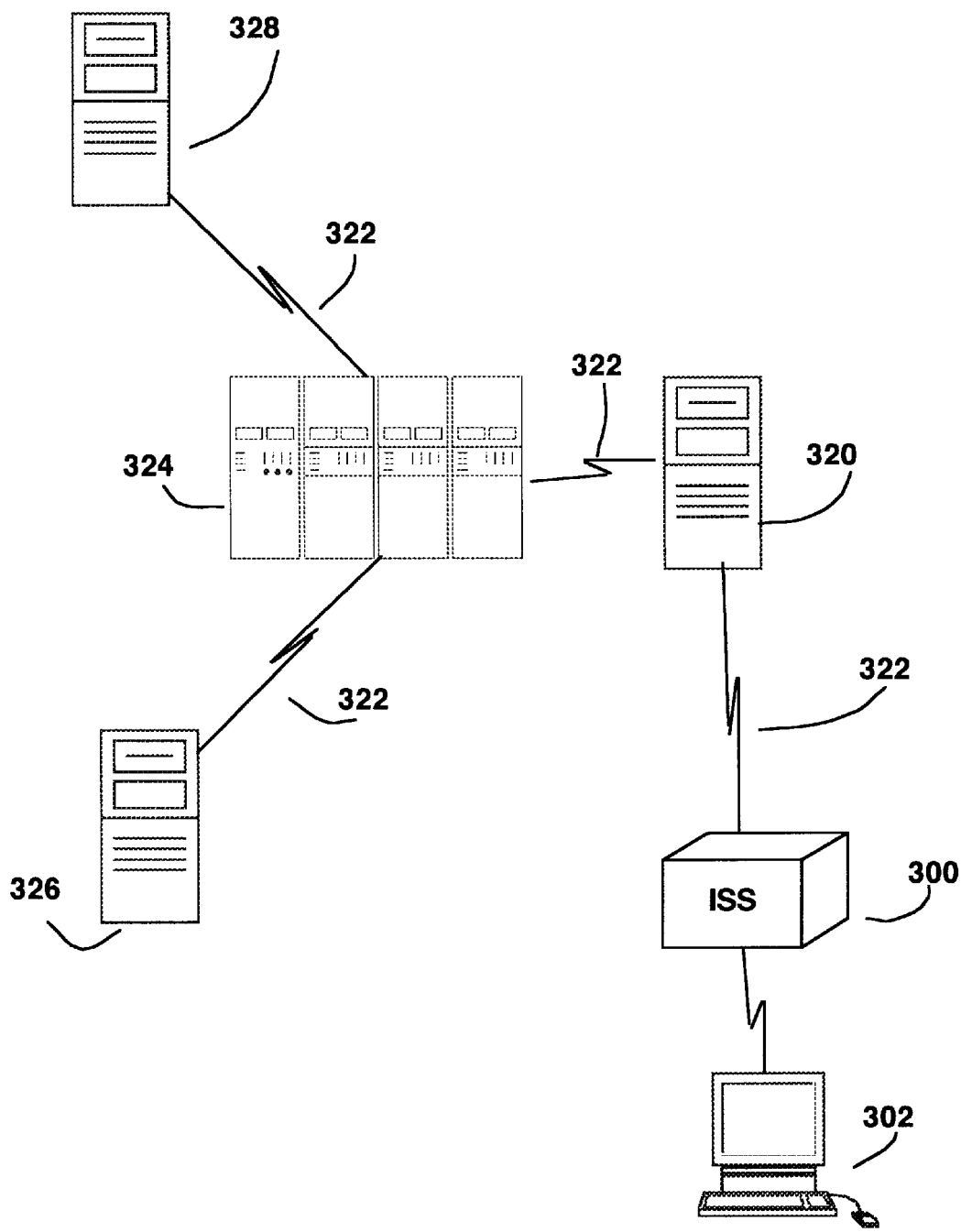
FIG. 1N is a schematic drawing of an implementation of the present invention over a network.
Figure 2A:
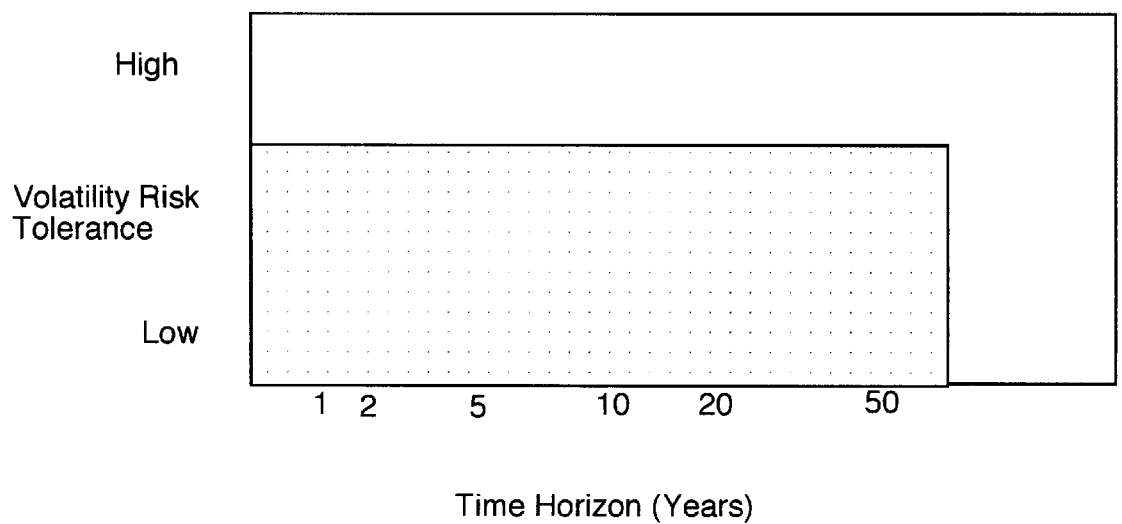
FIG. 2a is a schematic diagram in grey scale of a two dimensional slider control according to the method and apparatus of the present invention.
Figure 2B:
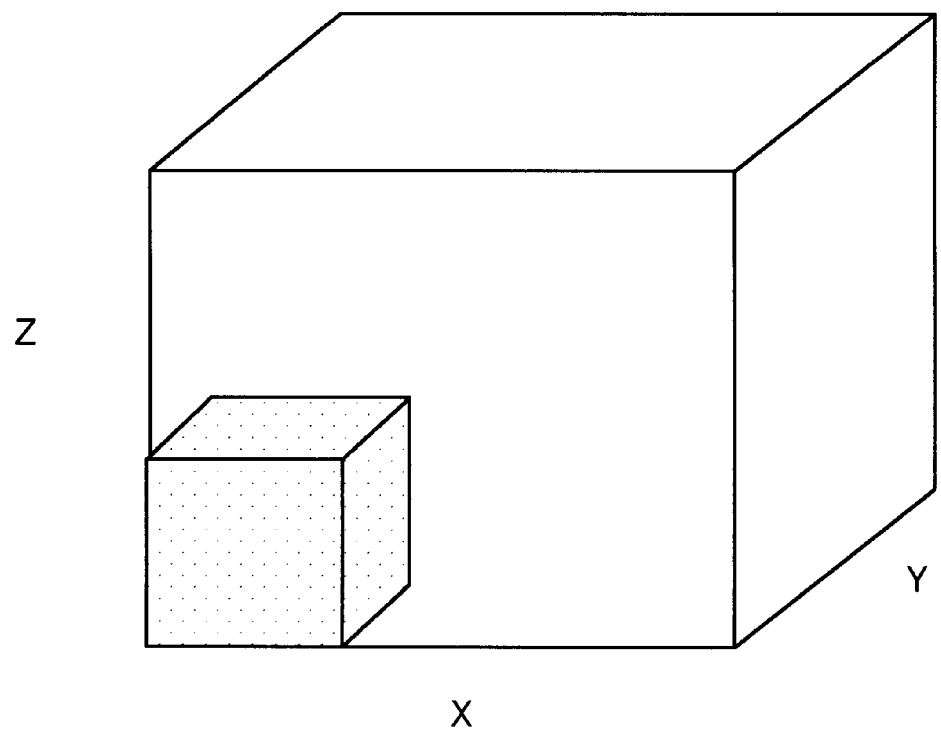
FIG. 2b is a schematic diagram in grey scale of a three dimensional slider control according to the method and apparatus of the present invention.
Figure 2C:
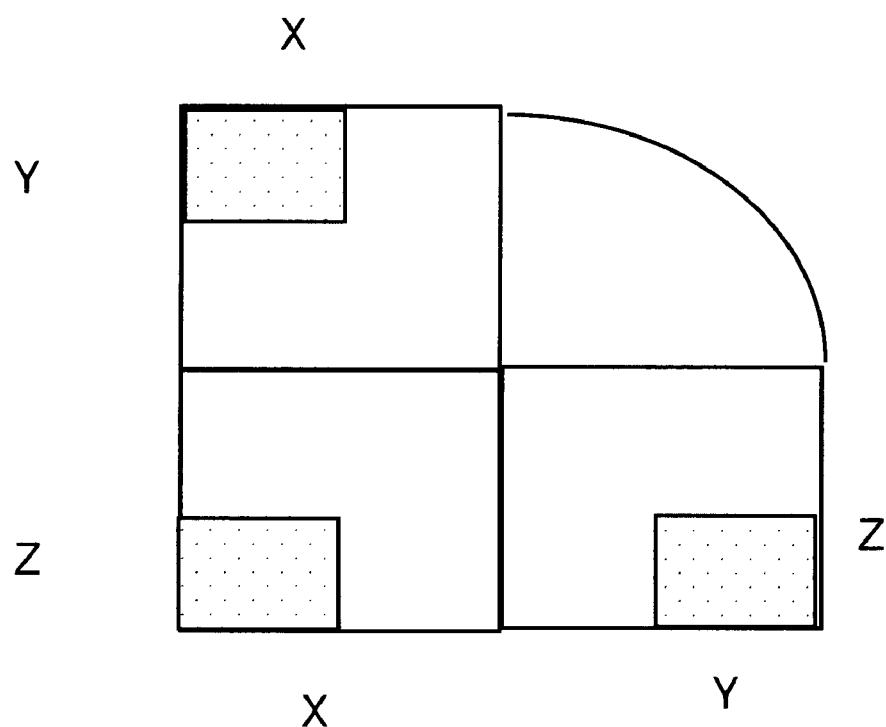
FIG. 2c is a schematic diagram in grey scale of a three dimensional slider control that displays two-dimensional representation rather than a projection of a three-dimensional cube, according to the method and apparatus of the present invention.

In a preferred embodiment, in FIG. 1n, remote computer 320 might be located at the site of a brokerage firm authorized to accept and execute securities transactions for the users of the present invention. As can be seen, computer 320 might be located at a brokerage and in communications with various stock exchange computers 324, 326 and 328, to effect such transactions. As will be apparent to those skilled in the art, there are a number of ways that trades can be transmitted electronically for execution in a securities or commodities or other exchange.

Turning now to FIG. 1d, a different preferred embodiment of the confidence indicator of the present invention is shown. In FIG. 1d, an interactive text, color graphic and sound window 15 is shown. As indicated in the text box 15a, a user may click on buttons 16 highlighted in a specific color, such as yellow in the example shown, to obtain more text, or if desired, to hear an aural presentation of the concepts. In a preferred embodiment, audio scripts are accompanied by an animation of the screen display(s), that point out the controls of the present invention or highlight them as they are discussed, and show the movable control elements in motion. Again, this helps the user see, hear, and feel how to use them in a way that is much more immediate and clear than written help text or a manual of instructions. Usually, the user will naturally tend to use the interface controls of the present invention that are most suited to his or her learning style.

Using information supplied by a user in a profiling process (described below), the present invention displays, in the example shown in FIG. 1d, the results of a planned portfolio of investments based on the user's anticipated contributions. This can be shown in many more ways than those illustrated herein. For example, returns at different confidence levels could be shown, probable interim loss, volatility, sensitivity to interest rates, country, industrial sector economic performance, etc., could all be shown, as well as a number of other factors without deviating from the spirit of the present invention.

As shown in FIG. 1d at button 16-1, the user in this example desires to have $138,312 USD in savings by the year 2021. Button 16-2 of FIG. 1d allows the user to enter a number in box 19, or, if desired, move slider 18 to indicate the amount of money the user wishes to save each year in a tax-deferred investment account such as a US 401(k) account.

In a preferred embodiment, the present invention calculates the confidence level that the user can associate with meeting the specified goals with that level of annual investment. As shown or described at button 16-3, the present invention indicates that the user will need to earn a 15.6% average annual return to meet the stated goal. As shown in FIG. 1d, button 16-4 shows a confidence level expressed as a percentage, in box 19b and as a bar graph 20 that the user will achieve the stated goal with the stated annual investment. In this example, the present invention calculates that the likelihood of meeting the goal is at the 53% level, or roughly one chance in two that the goal will not be met. Bar graph 20 also shows this pictorially, with the likelihood expressed in a red color (indicating an undesirable risk level), and with text indicators such as the tag line "50%—risky, save more now or later."

Conversely, in FIG. 1e, confidence levels for a better strategy are shown. For the same savings goal, if the user invests $2124 USD annually in the 401(k) plan, the system shows at text box 19b and bar graph 20 that there is a 92% chance that the goal will be reached, and in the text at button 19c, the average return needed to meet the goal is 7.30%. In a preferred embodiment, other performance statistics can also be shown, such as maximum interim loss, also known as "drawdown" calculated to a confidence level.

In calculating the confidence level for a given strategy, the present invention uses any of several approaches. When a desired confidence level is known, and the risk factors occur in a probabilistic distribution, as shown for median life expectancy in graph A of FIG. 9, the present invention selects the percentile in the distribution shown in graph B of FIG. 9 that will be more likely to yield that result for each curve. For example, if life expectancy is a factor, and the user wants to be 95% sure that funds will be available for his or her retirement, there are two ways the present invention can analyze results to achieve the desired confidence level. First, the 95th percentile of life expectancy could be selected, instead of the median or 50th percentile.

Alternatively, the probability of living to a certain age is calculated using known procedures from mortality tables. Next, this can be combined with the expectations of return to calculate the probability that a given amount of money invested in a portfolio would yield the desired funds.

In a preferred embodiment, the present invention first ascertains the degree of confidence the user would like for his or her plan, regarding life expectancy and investment performance, either separately or together. This could be expressed not only as a percent, but in odds, or other subjective or metaphorical measures, such as "give me 5-Star plan" etc., which the present invention transforms into a numeric value. In one preferred embodiment, life expectancy is computed from mortality tables.

For any population for which frequency distributions are available, the present invention can calculate the ranks or percentiles from which to calculate confidence. As is known in the art, for normal distributions (also known as Gaussian or bell-shaped curves) a set of analytic approaches are available such as the formula given below. For other distributions that do not have Gaussian properties, numerical methods known in the art can be used.

As is also known in the art, for systems that work through time, such as the stock market, cumulative variance, or variance over time is inversely proportional to the square root of time. Thus, if the mean annual return and standard deviation of annual returns is known, the standard deviation of five year returns is:

$$\text{stddev (5 year)}=\text{stddev}(1\ \text{year})*5/\text{sqrt}(5)$$

but the average annual return over five years is the same as the average annual return (by definition.)

In a preferred embodiment, once the present system has an input parameter such as a user's life expectancy estimate based on mortality tables and the user's present age, the present invention has a planning horizon. The end point of the user's time horizon for this example would be set either at retirement age or at a point between retirement and life expectancy.

Next, the present invention iteratively searches for the rate of return that best satisfies the equation:

$$goal\_amt = start\_amt * (1 + rate)\wedge\ years + \\ annual\_addition * ((1 + rate)\wedge\ years - 1)/rate)$$

where start_amt is present value, goal_amt is future value, annual addition is payment and rate is a decimal rate of return, to use terms familiar to those who work with financial or compound interest calculations.

The portfolio mix that has the minimum standard deviation (and hence the lowest risk) can be found iteratively by this formula:

$$\text{nStdDeviations}=(\text{rate-mean\_return(portfolio)})/ \\ (\text{stddev(portfolio)}*\text{years/sqrt (years)})$$

To find the portfolio mix with the highest confidence that the required rate of return can be achieved, the present invention looks for the portfolio whose risk and return characteristics (that is, whose standard deviation and mean return) show the highest probability of achieving or exceeding the target rate of return.

Figure 8:
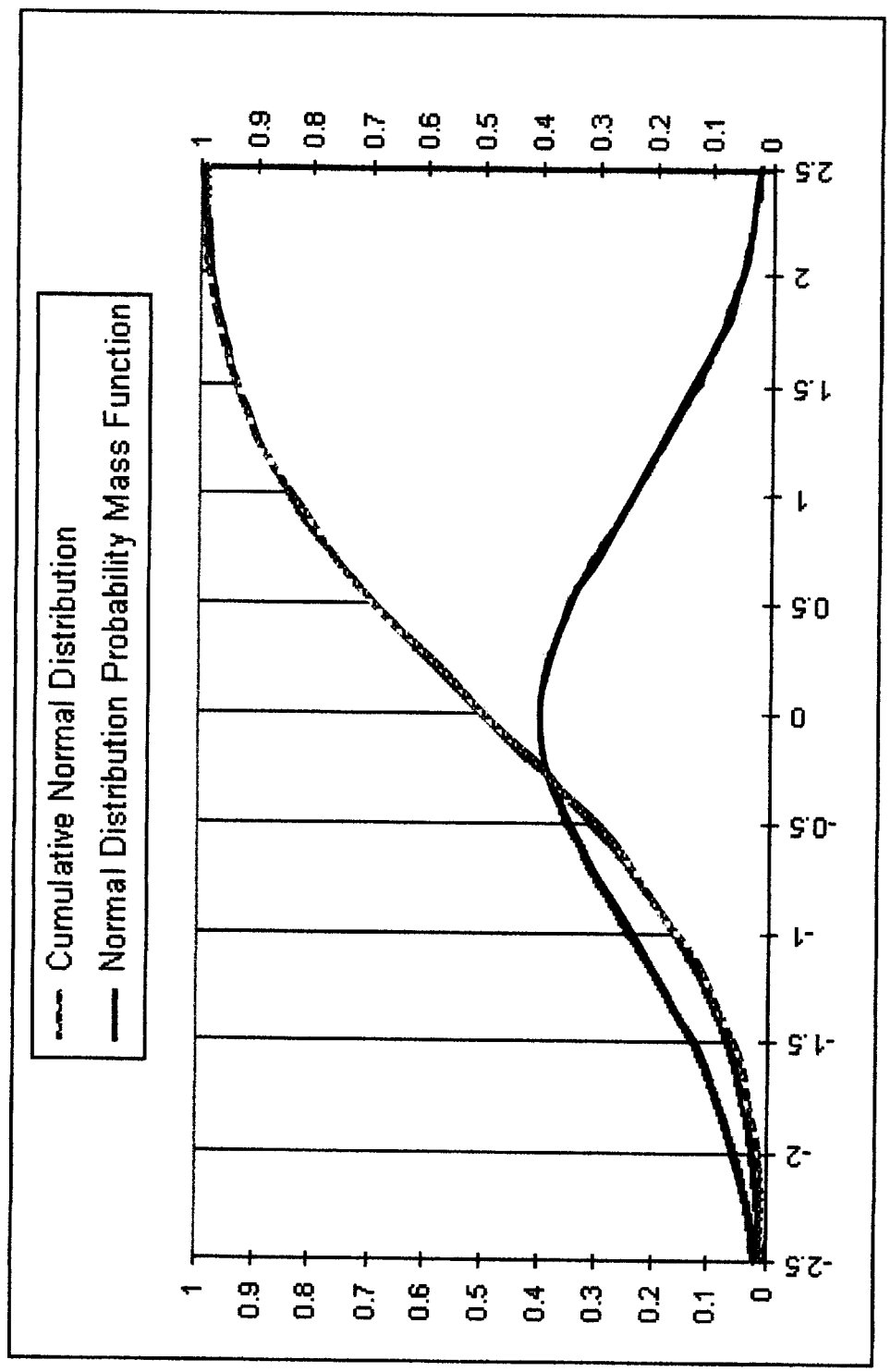
FIG. 8 is a chart of cumulative normal distribution according to the method and apparatus of the present invention.

The graph in FIG. 8 can help to illustrate this by showing the relation of this normal cumulative function to the familiar "bell curve" or Gaussian distribution. As can be seen in FIG. 8, the normal distribution or bell curve, is shown in red along the right axis, with the cumulative normal distribution shown in blue along the left axis. This formula is an integration from minus infinity to x of the normal distribution about the mean $\mu$ with standard deviation $\sigma$. In this example of FIG. 8, the mean is 0 and the standard deviation is 1. The graph of FIG. 8 shows, for example, that the probability of a result of 0 is about twice that of a result of 1 (or −1), and about 4 times the probability of 2 or (−2) occurring. The cumulative normal distribution curve shows that 10% (0.1) of the samples probably lie below −1.7, while 50% lie below 0 (the mean and median) and two-thirds lie below 0.5, with nearly 100% lying below 2.5.

The portfolio with the highest probability of meeting or exceeding the target is the portfolio where the target rate is the minimum number of standard deviations below that portfolio's mean return. This may appear backwards, but as can be seen by looking at FIG. 8, assume portfolio 1 has a mean return of 15% per year and a standard deviation of 30%. Portfolio 2 has a mean return of 12% and standard deviation of 5%. If the target rate is 10%, it is 0.17 deviations below mean ((10−15)/30) of portfolio 1, or −0.17 but is (10−12)/5=0.4 standard deviations from the mean of portfolio 2. Now looking at the cumulative normal distribution curve in FIG. 8, the cumulative probability of falling below −0.17 standard deviations (see −0.17 on the x axis) is almost 50%.

Still in FIG. 8, for the second portfolio, −0.4 standard deviations, the value of the blue curve, is less, about 0.35, indicating that there is about a 35% chance of the actual rate of return falling below the target, and a 65% chance of being above. To the naive investor, the higher average of portfolio 1 might be more attractive,—indeed, it could pay off quite handsomely—but portfolio 2 has a higher probability of meeting or exceeding the target, and thus provides more confidence (about 60% versus 50%) that portfolio 2 will make the user's investment work successfully. While this example using FIG. 8 is reasonably clear to one familiar with probability and statistics, this is the kind of complexity that an ordinary investor is not likely to understand intuitively.

Consequently, as mentioned above, color mapping is used to show these confidence levels in a way that makes the results much easier to understand. The color mapping is arbitrary, as it is intended to use an additional channel of information, namely, cultural norms for color meaning, to summarize the % confidence numbers. In an alternative embodiment of the present invention, confidence levels from 100% to 50% could be shown as gradually moving from full green to full red, going through yellow, with confidence levels from 50% to 05 going from full red to full black. In an RGB (red, green, blue) color system, colors might be computed as:

Color(confidence) = if confidence >50%, then
    c=(confidence-75)*4 {c ranges from −100 to +100}
    color.percent_red=maximum(−c,0)
    color.percent_green=maximum(c,0)
    color.percent_blue=0 else
    c=confidence*2 {c ranges from 0 to 100}
    color.percent_red=c
    color.percent_green=0
    color.percent_blue=0

Variations of this color mapping are used throughout the system of a preferred embodiment.

In the example of retirement planning for a life expectancy, as described above, the investment confidence level for the recommended portfolio is measured as standard deviations from the mean according to the cumulative normal function:

$$f(x, \mu, \sigma) = \frac{1}{\sqrt{2*\pi*\sigma}} * e^{-\left[\frac{(x-\mu)^2}{2*\sigma^2}\right]}$$

where x is the value, $\mu$ is the mean, $\sigma$ (or sigma) is the standard deviation, e is the base of natural logarithms, $\pi$ is the ratio of the circumference of a circle to its diameter. This formula sums the probability of an event or sample occurring at x or below.

As will be apparent to those skilled in the art, if the distribution being investigated is not Gaussian, or one for which similar mathematical techniques are known, the present invention would find the portfolio or choice with the maximum percentile rank.

While a preferred embodiment of the present invention uses confidence indicator interactive color display 02 to interactively show the results of various investment strategies, as will be apparent to those skilled in the art, the same indicators can be used for other industries where the parameters vary in two dimensions similar to the investment risks shown here.

Turning now to FIG. 1f, an interactive investment allocator of the present invention is shown. Here window 30 shows a bar chart 32, with coin symbols 33, apportioned into various stacks 46. As seen in FIG. 1f, a series of gauges are positioned beneath various texts, indicating for example at gauge 34 for Treasury bills, the historical mean return of that investment. Treasury bills, for example show a historical mean return of 4%, the black line on the meter and plus or minus 2 standard deviations from the mean, as indicated by the red area of the meter. As seen here, the stack of coins 46 allocated to gauge 34 for Treasury bills is nearly 60% of the total portfolio. Graph 50 shows in two colors, the results of the allocations indicated in FIG. 1f. In this example, most of the coins are allocated to investments with low risk of capital loss but with a likelihood of lower return than higher risk investments.

Now turning to FIG. 1g, a different representation is shown. Here, the user has simply moved one or more of the "coins" 33 to stacks for higher yield investments. In this case, 60% of the allocation is to small stocks as indicated by gauge 44. Concomitant with the change in allocation the present invention displays the probable consequences of any change as changes in graph 50.

In a preferred embodiment of the present invention, the investment allocator, as part of the whole investment support system can show current allocations, show recommended allocations, and let the user control the allocations by manipulating the stacks of coins (by moving one or more of the coins from one stack to another, for example). Since the present invention interactively displays the probable consequences of any change instigated by the user, it also helps the user understand and learn, interactively, about the effect of allocations on risk and return. As will be apparent to those skilled in the art, the investment allocator could use symbols other than coins for manipulation of other types of mathematical functions in other applications of the present invention.

Figure 6B:
FIG. 6b is an another illustrative profiling screen shown in color according to the method and apparatus of the present invention.

Referring now to FIGS. 6a through 6e, portions of the user profiler of the present invention are shown. In FIGS. 6a through 6e the profiling is for a simple retirement planner. In the screen display of FIG. 6a, the user is asked for age, income and retirement age data. In FIG. 6b, the user is asked to specify (and also provided with some educational information) his or her goals for retirement income. FIG. 6c shows the 2d slider control of the present invention, described above, that allows the user to specify his or her contributions to the plan. FIG. 6d of the profiler of a preferred embodiment asks the user to specify a confidence level he or she desires for the plan, while also providing some background on the results of different levels. Similarly, in FIG. 6e, the user is asked how confident he or she wishes to be that the income for retirement will not run out during the user's life expectancy. Again, FIG. 6e also includes more informational material to help the user understand the implications of the choices.

Figure 7A:
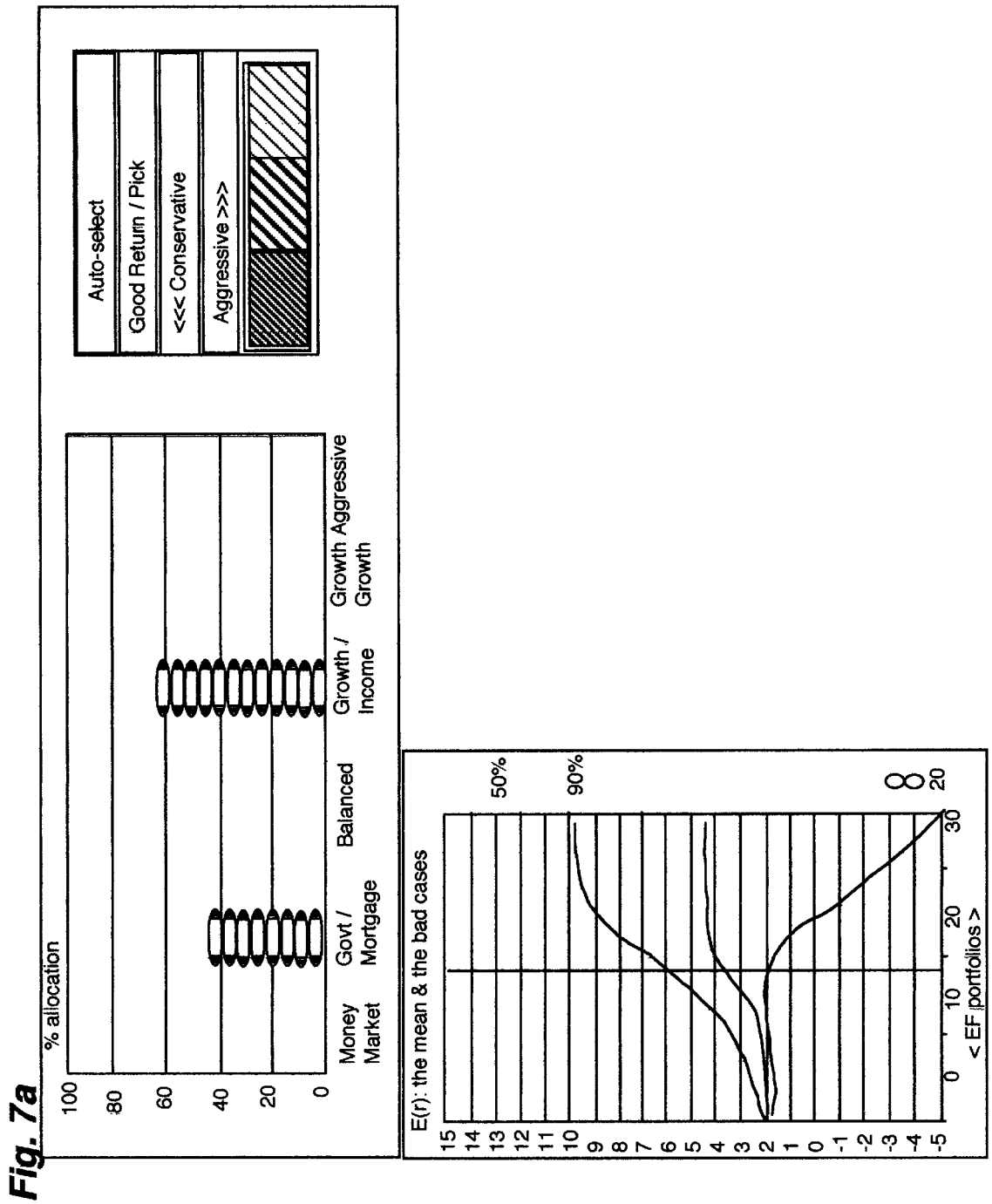
FIG. 7a shows an illustrative display screen in color depicting the projected returns from a portfolio according to the method and apparatus of the present invention.
Figure 7B:
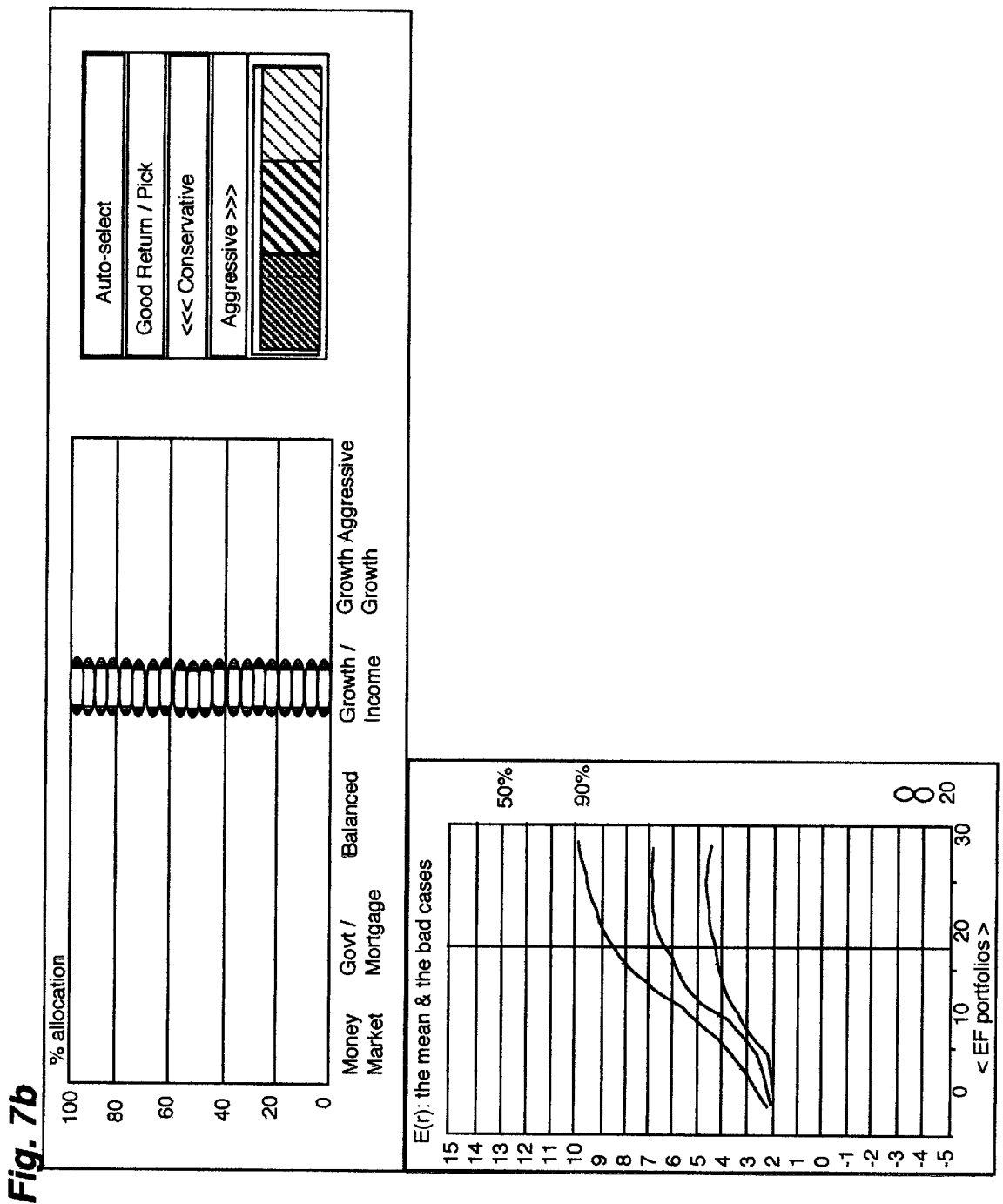
FIG. 7b shows another illustrative display screen in color depicting the results of holding a portfolio according to the method and apparatus of the present invention.
Figure 7C:
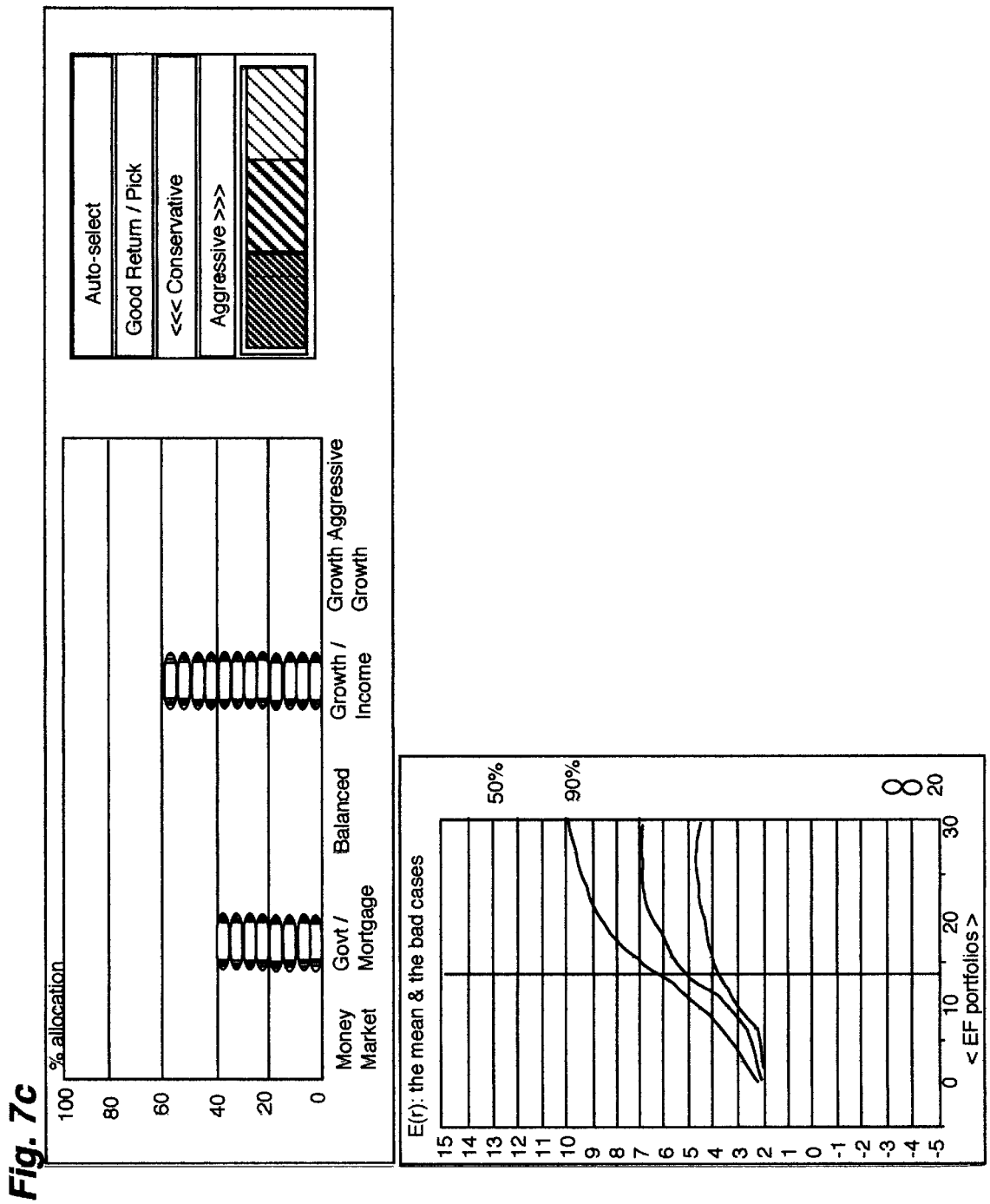
FIG. 7c shows still another illustrative display screen in color depicting the results of holding a portfolio according to the method and apparatus of the present invention.

In FIGS. 7a through 7c, the results of an optimizer feature of the present invention are shown. In a preferred embodiment, the present invention's virtual investment advisors make use of existing analytical tools, such as modern portfolio theory, efficient portfolios, linear regression analysis, etc., to screen securities for potential inclusion in a portfolio. FIG. 7a, for example, shows that for a portfolio of 40% government bond funds and 60% growth & income funds, for this user's goals and needs (income, needs, savings, other sources, life expectancy, etc.) the probable retirement income would be as shown by the blue bar. The smaller graph in FIG. 7a shows expected return of the "efficient portfolios" constructed according to modern portfolio theory (those combinations of the seven investment classes that have maximum return for a given volatility risk). Return is shown on the y axis, portfolio number on x axis, with the median, 70% confidence (70% chance of meeting or exceeding indicated return) over 3 year time horizon. In the smaller chart of FIG. 7a, the vertical Gold line indicates the 40/60 mixture portfolio. FIG. 7c shows a 20 year time horizon. Note that for the same portfolio, the 70 and 90% confidence curves have moved up, verifying the notion that over a long period you can reasonably take more risk with investments. Note that the median does not change with horizon.

FIG. 7b shows 20 years, but the optimizer of a virtual investment advisor of the present invention has found the portfolio with the optimum 90% confidence. Note that in a preferred embodiment, the confidence-based optimizer will find different portfolios at three years based on confidence level required (each confidence level's maximum point may correspond to a different portfolio).

Now turning to FIG. 1h there are shown, in exploded detail, the kind of indications shown on a smaller scale in chart 50 from FIG. 1g. In FIG. 1h, data from a user profile is shown, in part, in overview window 60, indicating the amount of money in savings today at box 66, the starting age of the user at box 68, the yearly savings he or she plans to invest at box 70, the accumulated rate of return desired at box 72, the planned retirement age at box 74. As indicated in this chart, based on the data supplied by the user there would be retirement savings as shown in box 76. If plan withdrawals are as shown at box 82, the retirement rate of return for the savings would be as shown in box 84. Given the data specified by this user, it can be seen at box 86 that there would be no funds left for heirs, and that the funds for the retiree would be exhausted at the age shown in box 88. These results are shown graphically in the darker shaded area 62, representing contributions and withdrawals only, and the lighter shaded area 64, representing accumulated savings with interest.

The same overview window 60 is shown with different results in FIG. 1i.

Turning now to FIG. 1j, a graphic depiction of portfolio returns showing absolute returns, and comparisons to benchmarks is shown. In a preferred embodiment, the user is able to see how his or her recommended (or actual) portfolio compares to others. In a preferred embodiment, benchmarks are chosen to be appropriate comparisons for the user's portfolio, where appropriateness means similar risk. For example, if the portfolios consist of large US Stocks, the Standard and Poors (S&P) 500 Index is a good benchmark. For worldwide stocks, the S&P 500 might be interesting as a benchmark, but the EAFE index (the Morgan Stanley Europe Americas Far East index) is probably better. As will be apparent to those skilled in the art, there are techniques for risk-adjusting performance to make such comparisons more valid.

The benchmarks shown in FIG. 1j are constructed as follows, in a preferred embodiment. Given a time series of values for the portfolio P[], and values for the benchmark B[], where x is time) the start of hypothetically buying the portfolio or benchmark/index) and y is the holding period, then the present invention calculates:

$$point(x,y)=colorFunction(P[x+y]/P[x], B[x=y]/B[x]$$

as long as x+y is less than the maximum time for which you have data.

The colorFunction of FIG. 1j is arbitrary and can be continuous or discrete. The examples shown in FIG. 1j are discrete and labelled in the legend. To illustrate another example of benchmarking according to the method and apparatus of the present invention, one could take the ratio of the portfolio performance i.e, P[x+y]/P[x] which is itself the ratio of the ending value to the beginning value, and divide by the benchmark performance of the same period. If the portfolio is greater, the point is colored green, if less, the point is colored red. Thus, all combinations of starting time and holding period where the portfolio underperformed would be red, and the user is able to quickly see the gross performance, and more specifically, the time periods or holding periods that were unusually good or bad.

As will be apparent to those skilled in the art, the inputs to the color function used in FIG. 1j could be any series of numbers in any industry one wants to compare. For example, x could be flight takeoff time, and y could be flight duration, and the color function could be the given satisfaction of passengers measured against a benchmark of the attitudes of people at that time who are not on an airplane. From such a comparison, airline management could see if there are times and flight durations that should be avoided or encouraged because of the effect on passenger satisfaction, or whether some service should be performed during flight to improve satisfaction.

Now turning to FIG. 3, a flow diagram of the overall logic of the interactive two-dimensional color confidence indicator 02 of the present invention. At step 100, a pointer event such as a mouse click or a keystroke occurs, (say within combined risk window 04 of FIG. 1a) and is interpreted by the present invention. Next, at step 110, the results to display are calculated by evaluating the formula:

$$v=f(x,y)$$

where v is the color or pattern to be displayed surrounding the position indicator. As mention, the color function is arbitrary, in that any colors that have positive and negative associations in prevailing cultural norms can be selected. In a preferred embodiment, the present invention uses the f(x,y) roughly as follows:

x is the time horizon, and y is investment volatility (risk) undertaken in a portfolio;

f(x,y) is the confidence that a portfolio with such risk will meet a goal by time horizon x, with confidence being calculated as discussed above. The confidence is then mapped to the colors to show the user the result without requiring the user to understand and interpret risk/confidence concepts and percentages.

For example, to convert 0–100% confidence to a red-green spectrum in an RGB color system as found on most computers, the present invention calculates as follows:

confidence=f(x,y)
c=confidence*2 (now ranges from 0 to 200)
color.percent_red=maximum(100c,0)
color.percent_green=maximum(c,0)
color.percent_blue=0.

This device can indicate results other than confidence, such as the probable maximum amount that a portfolio could fall over any interim period during the time horizon. This might be called "drawdown" in some areas of finance or "maximum adverse equity excursion." Using modern portfolio techniques of analysis through mean return and variance of return, the present invention can calculate the drawdown for a portfolio to a given level of confidence. For example, to estimate the worst probable loss of portfolio value (from a high value to the lowest value subsequent) over any time period within the time horizon, the present invention would first find the number of standard deviations represented by that confidence level. To estimate the worst probable loss with 95% confidence (that is, only a 5% chance that the actual worst loss will be greater than the estimate), the present invention could use the cumulative normal distribution function shown in FIG. 8 and described above to see that 5% is roughly −2 standard deviations.

Next, following this same example, the present invention would iterate over the years variable and find the maximum value for the function $$return = (1 + mean\_return)^{\wedge} years +$$
$$(-2(*standard\_deviation)*years/sqrt/years).$$

The estimated worst loss is 1-minimum_return, where return, mean_return, and standard_deviation are decimal percents. (For example, 6%=0.06). As will be apparent to those skilled in the art, the worst loss can thus be converted to colors, such as green for no loss to red for 90% loss) and displayed with the two-dimensional slider of the present invention as the user controls the years with the x axis and standard_deviation with the y axis.

Figure 4:
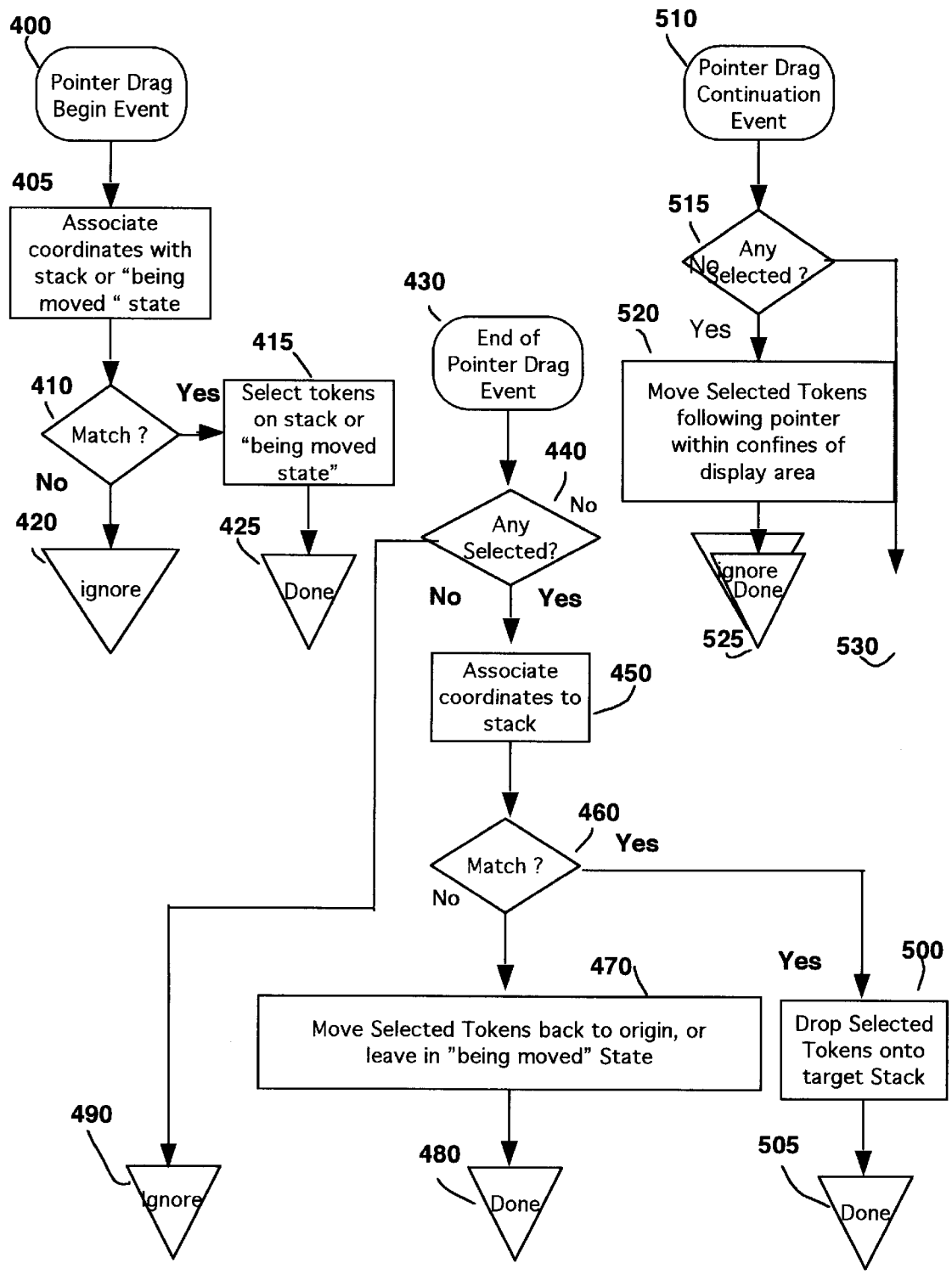
FIG. 4 is a flow diagram of the logic for the allocation control according to the method and apparatus of the present invention.
Figure 5:
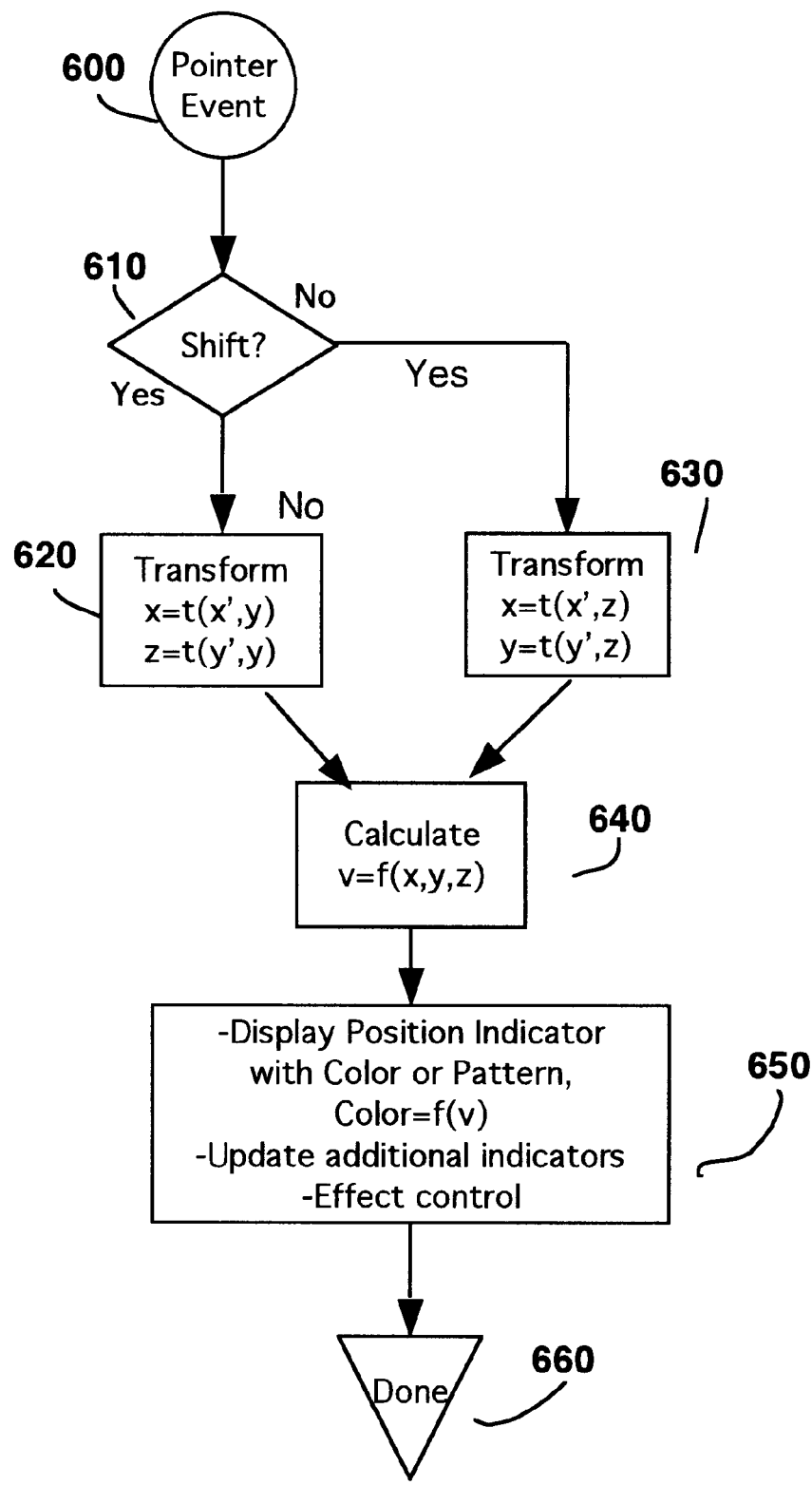
FIG. 5 is a flow diagram of a three-dimensional slider control according to the method and apparatus of the present invention.

Referring now to FIG. 4, the steps executed by the present invention to manage the investment allocator in a preferred embodiment are shown. At step 400, the present invention responds to a pointer drag begin event, transmitted to it by the operating system. At step 405, the present invention associates coordinates with one or more tokens or coins in a stack or a block of coins left in a "being moved" state from a previous operation. Decision block 410 checks to see if there is a match to and if there is none, the gesture is ignored at step 420. A match means that the x,y coordinates of the event are inside (or within some tolerance) of the area occupied by a block of one or more tokens. Since the present invention uses vertical stacks, tokens will be selected if they individually have coordinates at or above the pointer. If a block of previously selected tokens in the being moved state are matched, then that block is selected. If a block is being moved, the present invention will ignore attempts to select tokens on a stack, so that only one set or block can be moved at a time. For other applications, this may not be a necessary restriction.

If there is a match however, the present invention at step 415 selects the tokens on either the stack or the "being moved" state and returns at step 425. At step 510, the invention continues handling the event, by checking at step 515 to see if any were selected. If either a stack or a "being moved" state had been selected, the system, at step 510 moves the selected tokens or coins following the pointer to an area within the confines of the display area indicated by the pointer. and returns at step 525. To complete the event, at step 430, the system checks, at step 440 to see if any had been selected. If they have, they are associated to a stack and if a match is found at step 460, the tokens, at step 500 are dropped onto the target stack. In this latter instance, a match means, roughly that the coordinates of the block of tokens being moved corresponds to a stack, then the block is "dropped" onto the stack, and those tokens now belong to that stack. If no match within tolerance can be found, the token block may be returned to the starting point, or left at the last position in the "being moved" state.

Now referring to FIG. 1k, it can be seen that in a preferred embodiment, the present invention selects from one or more virtual investment advisors to provide portfolio analysis and recommendations to a user. This is done at step 145 of FIG. 1k where the invention specifies the security selection and trading algorithms to be used. As will be apparent to those skilled in the art, there are a number of known financial analysis techniques that can be used to structure recommendations. From techniques such as linear regression tools, efficient portfolio analysis, neural networks analysis, and so on, a virtual investment advisor (VIA) can be established to recommend a portfolio. Once such a portfolio has been recommended, a preferred embodiment of the present invention can optionally simulate its performance using historical market data, or project its performance based on historical averages.

In a preferred embodiment, a VIA performs two main processes or activities: security selection and trading. It is possible for a VIA to have only security selection, leaving the connection of security selection to trades up to the user. Security selection involves screening, ranking, or some other processing to determine a list of securities suitable for the user. Suitability is determined using the user profile. For example, a profile objective of "value-style common stocks" could be implemented by screening a securities database for stock value criteria such as low price/earnings (P/E) ratio and high dividend yield. Similarly, a time horizon (time until the purpose of the investment changes) that is short implies the need for low risk investments to preserve capital.

A wide variety of trading management strategies are also possible. For example, an alternative preferred embodiment trading management strategy might compare the existing portfolio holdings and their selection rankings against the rankings in the universe of securities not currently held in this user's portfolio, with the resulting recommendation being to sell current holdings with lower ranks and buy securities with the highest ranks. As will be apparent to those skilled in the art, an obvious refinement, among many, would be to consider trading costs so as to limit the amount of trading.

Figure 11A:
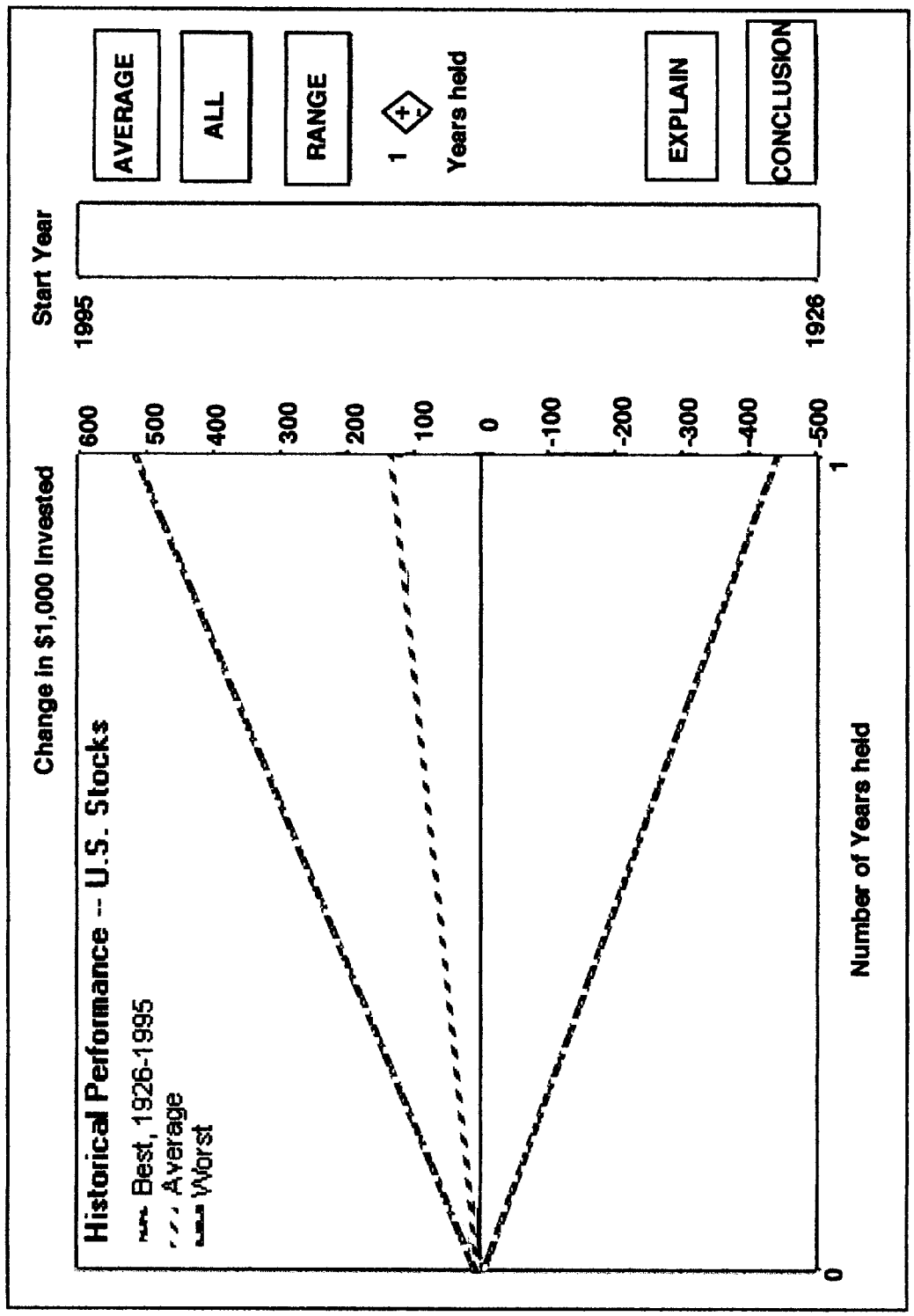
FIG. 11a is an indicator for showing historical performance of the stock market according to the method and apparatus of the present invention.
Figure 11B:
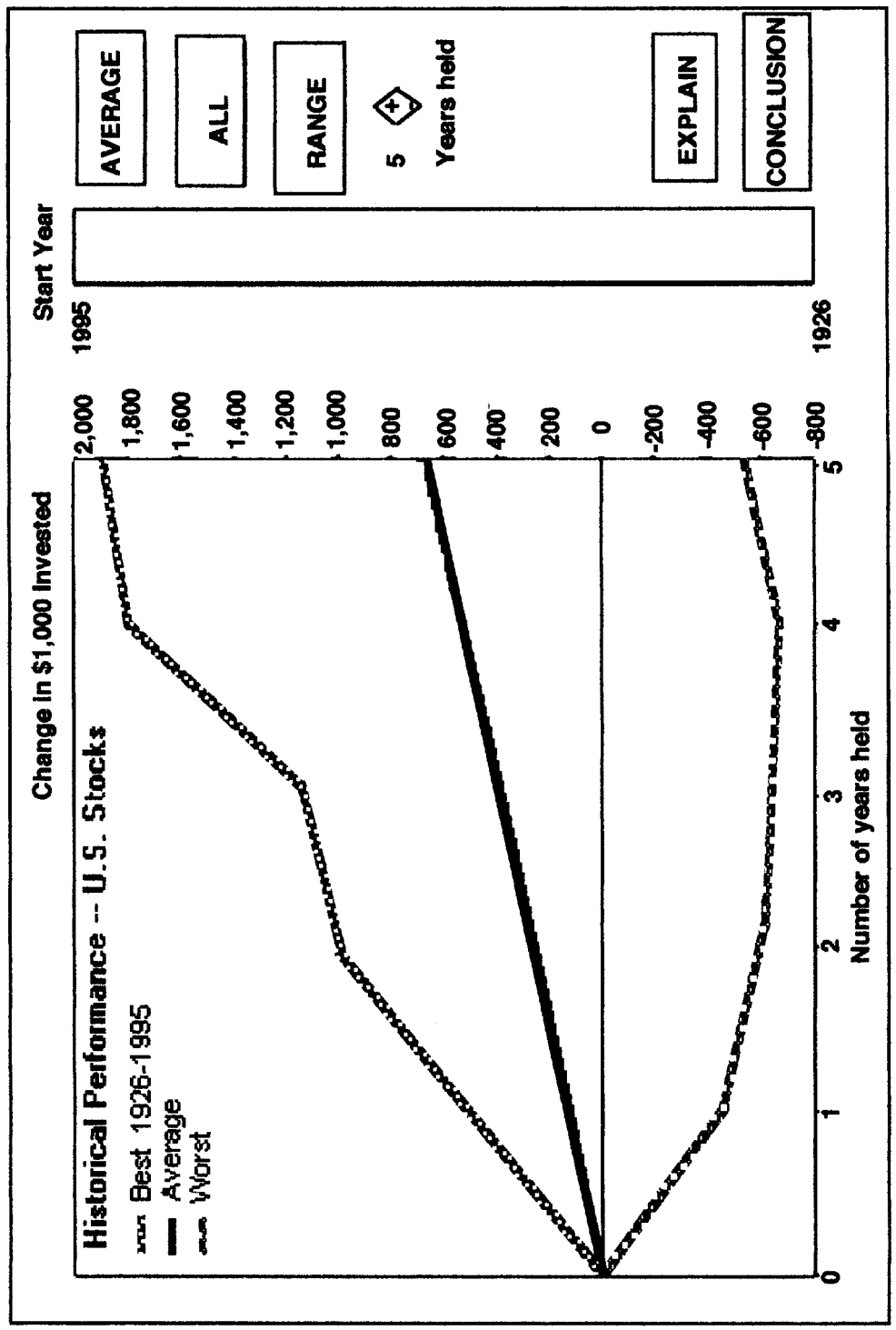
FIG. 11b is an indicator showing historical performance of the stock market according to the method and apparatus of the present invention.
Figure 11C:
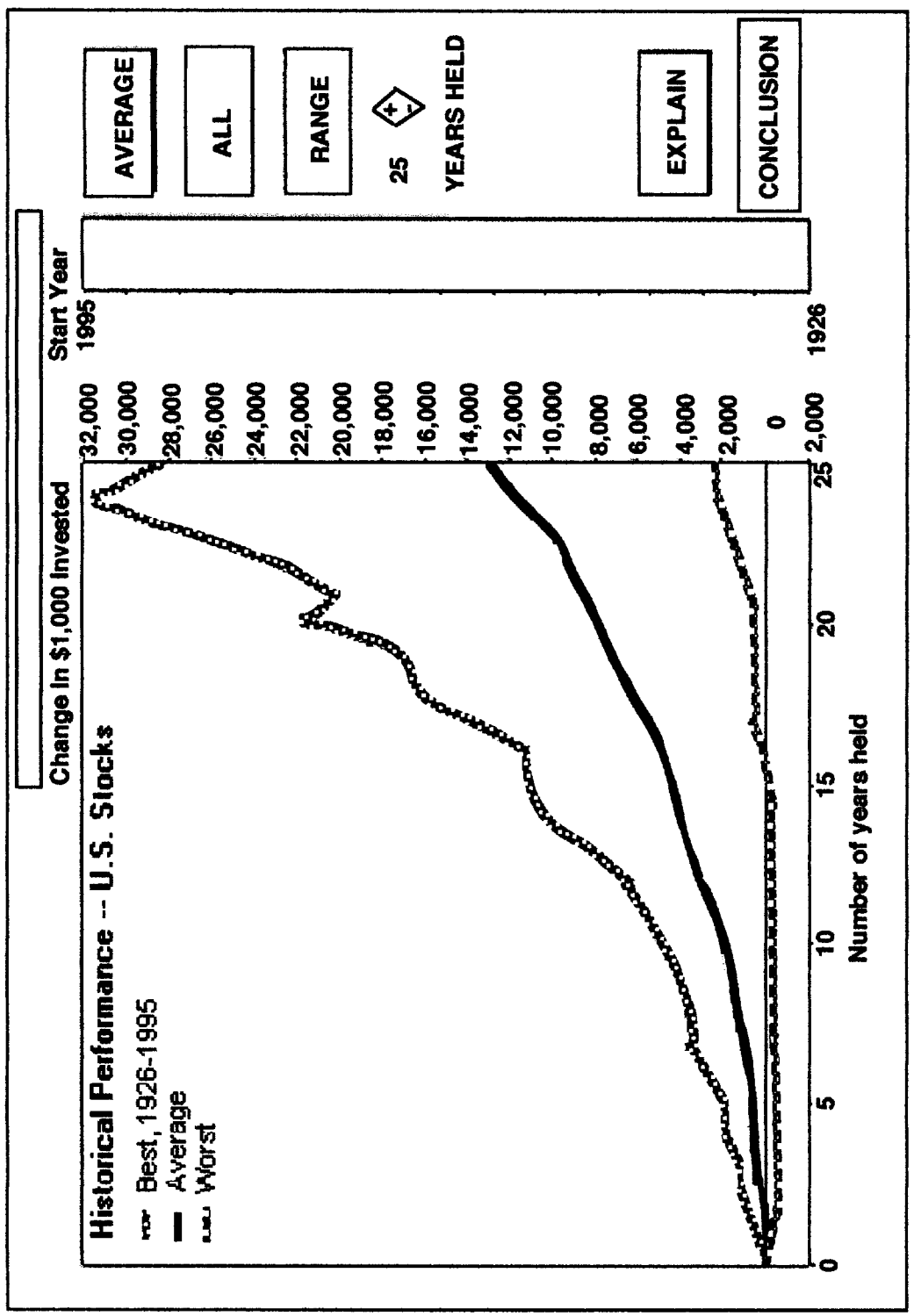
FIG. 11c is an indicator showing historical performance of the stock market according to the method and apparatus of the present invention.
Figure 11D:
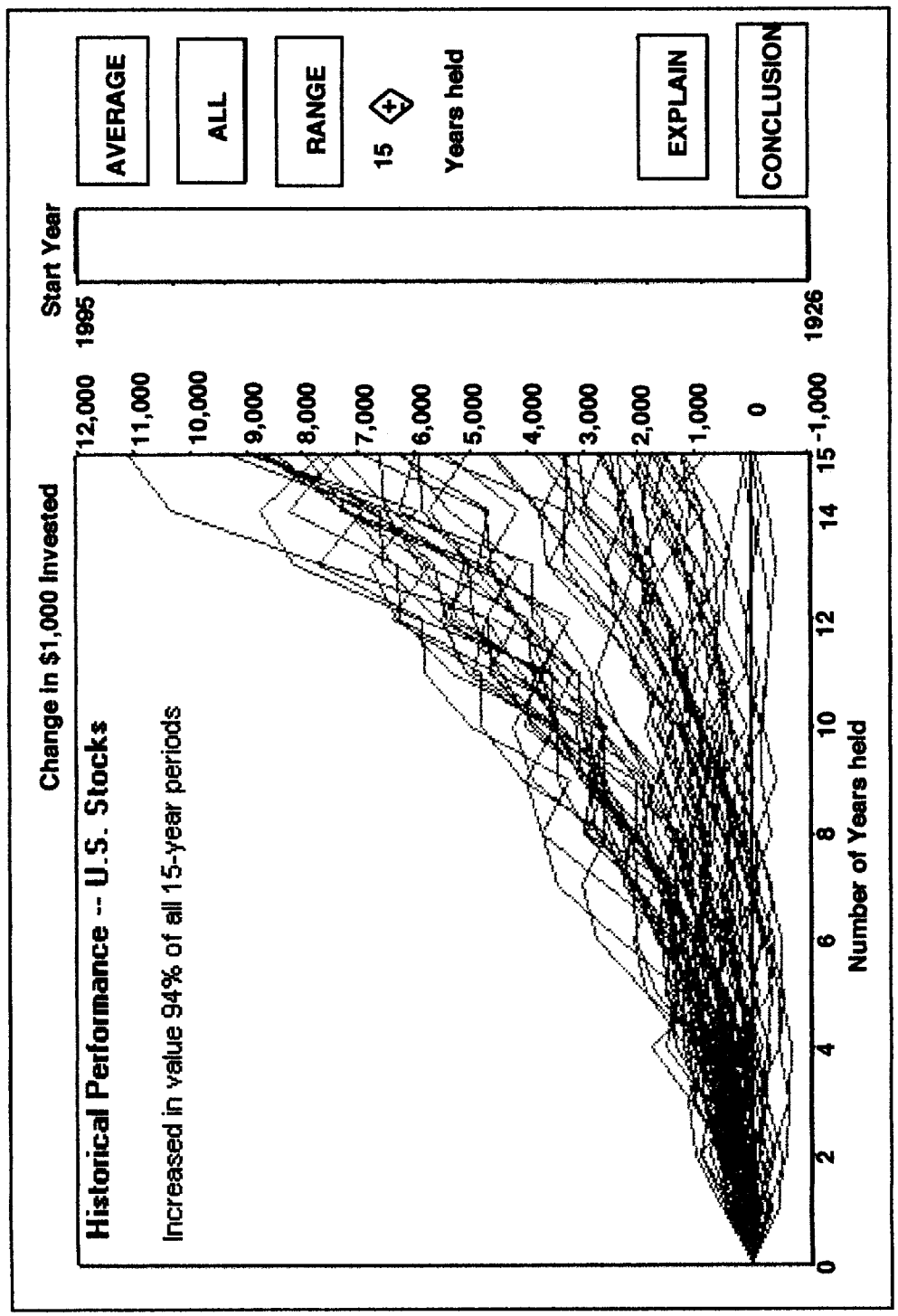
FIG. 11d is an indicator showing historical performance of the stock market according to the method and apparatus of the present invention.
Figure 11E:
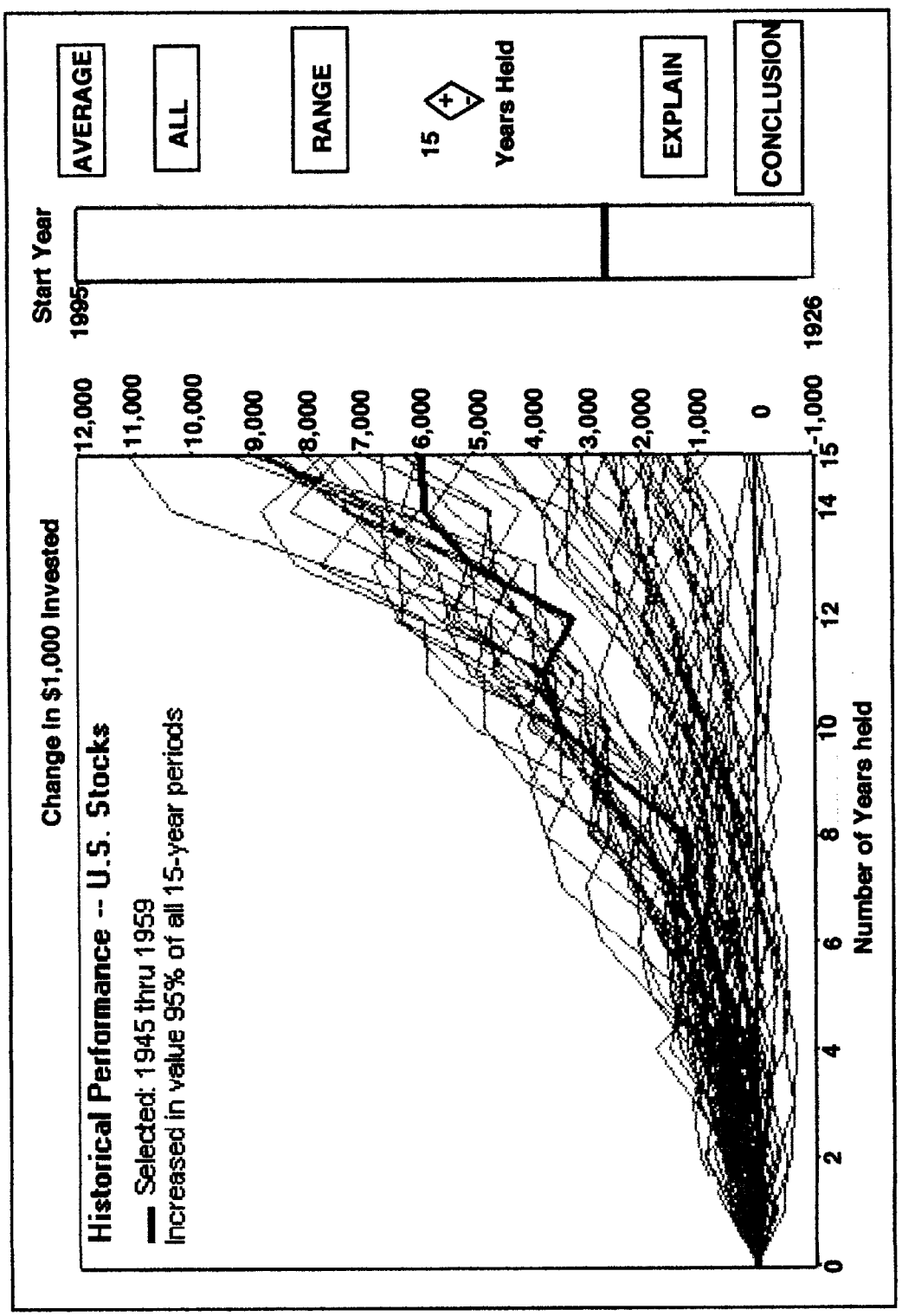
FIG. 11e is an indicator showing historical performance of the stock market according to the method and apparatus of the present invention.

Referring now to FIGS. 11a through 11e, additional interactive educational features of the present invention are shown. FIG. 11a allows the user to see a summary display of US historical stock market performance for all one-year time periods, indicating a best performing year, a worst performing year and an average performing year. By using the indicator arrow or entering a number, the user can display holding periods of different lengths, such as FIG. 11b, which shows the same data but for a holding period of 5 years, and FIG. 11c, which shows 25 years. Another feature of the present invention is shown in FIG. 11d, in which the user can see the individual tracks of all holding periods during the history. FIG. 11e allows the user to superimpose on the charts of FIG. 11d, any particular year or statistic he or she would like to compare to the cluster chart.

In a preferred embodiment, the present invention is implemented in Java for Java-capable browsers and computer systems, but as will be apparent to those skilled in the art, it could also be implemented in any of a number of programming languages such as C, C++, assembler, ADA, Pascal, and so on. In a preferred embodiment, Microsoft's ACCESS™ database software is used to store client profiles on electronic storage media, such as disks, but any of a number of database management programs commercially available could also be used, as could flat files. In the same manner, while databases or flat files on disk are used in a preferred embodiment to store user profiles and similar data, it will be apparent to those skilled in the art that such data could also be stored in computer memory or be accessible to one computer over a network or over the Internet. Similarly, while a preferred embodiment uses software programs to implement the invention, those skilled in the art know that some or all of the present invention could also be implemented in firmware or circuitry without deviating from the spirit of the present invention.

We claim:

1. A computer implemented method for interactively manipulating probabilistic distributions, comprising the steps of:
   collecting a user profile with stated goals relative to data about which probabilistic distributions exist;
   simulating the future performance of the selected data with historical data;
   calculating the likelihood of meeting the stated goals using the probabilistic distributions in response to movements of an interactive user operated control; and
   iteratively generating the results to the user as a confidence level indicator.

2. The method of claim 1, wherein the step of iteratively generating the results in a continual manner further comprises the step of computing the confidence level according to the following formula:

$$f(x, \mu, \sigma) = \frac{1}{\sqrt{2*\pi*\sigma}} * e^{-\left[\frac{(x-\mu)^2}{2*\sigma^2}\right]}.$$

3. The method of claim 1, wherein the step of iteratively generating the results in a continual manner further comprises the step of computing color displays according to the following coded instructions:
   Color(confidence)=if confidence>50%,
   then
   c=(confidence−75)*4 {c ranges from −100 to +100}
   color.percent_red=maximum(−c,0)
   color.percent_green=maximum(c,0)
   color.percent_blue=0
   else
   c=confidence*2 {c ranges from 0 to 100}
   color.percent_red=c
   color.percent_green=0
   color.percent_blue=0

4. The method of claim 1, wherein the step of iteratively generating the results in a continual manner so that immediate feedback is displayed in response to movements of said interactive user operated control, further comprises the step of using said interactive user operated control as an input specifier and an output display.

5. The method of claim 4, further comprising the step of using said interactive user operated control confidence indicator to select a result that will meet or exceed a threshold value.

6. The method of claim 5, further comprising the step of using said interactive user operated control confidence indicator to manage for a result less than a threshold value.

7. The method of claim 5, further comprising the step of using said interactive user operated control confidence indicator to manage for a desired result over a specified time period.

8. The method of claim 5, further comprising the step of using said interactive user operated control confidence indicator to manage for a result based on life expectancy.

9. The method of claim 1, further comprising the step of using graphical user interface elements to represent confidence levels as part of the interactive user operated control.

10. The method of claim 9, further comprising the step of associating a first graphical user interface element to represent a desired confidence level.

11. The method of claim 9, further comprising the step of associating a second graphical user interface element to represent the actual confidence level of a specified result.

12. The method of claim 9, further comprising the step of associating a color with a graphical interface element to represent subjective comfort levels.

13. The method of claim 9, further comprising the step of computing and displaying the confidence indicators interactively in real time as the user manipulates the data.

14. A computer implemented system for interactively manipulating probabilistic distributions, comprising:
   an input device for collecting a user profile with stated goals relative to data about which probabilistic distributions exist;
   a computer program for simulating the future performance of the selected data with historical data;
   a second computer program for calculating the likelihood of meeting the stated goals using the probabilistic distributions in response to movements of an interactive user operated control; and
   a display for iteratively generating the results in a continual manner so that immediate feedback is displayed to the user as a confidence level indicator.

* * * * *